(12) United States Patent
Miller

(10) Patent No.: US 12,407,743 B2
(45) Date of Patent: *Sep. 2, 2025

(54) SYSTEM AND METHOD FOR ASYNCHRONOUS USER-CENTRIC CONTEXT-BASED SHARED VIEWING OF MULTIMEDIA

(71) Applicant: Charter Communications Operating, LLC, St. Louis, MO (US)

(72) Inventor: Toby Miller, Aurora, CO (US)

(73) Assignee: Charter Communications Operating, LLC, St. Louis, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/749,345

(22) Filed: Jun. 20, 2024

(65) Prior Publication Data

US 2024/0340328 A1 Oct. 10, 2024

Related U.S. Application Data

(63) Continuation of application No. 17/318,830, filed on May 12, 2021, now Pat. No. 12,058,189.

(51) Int. Cl.
| | |
|---|---|
| *H04L 65/611* | (2022.01) |
| *H04L 65/1096* | (2022.01) |
| *H04L 65/40* | (2022.01) |
| *H04L 65/401* | (2022.01) |
| *H04L 65/75* | (2022.01) |

(52) U.S. Cl.
CPC ........ *H04L 65/611* (2022.05); *H04L 65/1096* (2013.01); *H04L 65/40* (2013.01); *H04L 65/401* (2022.05); *H04L 65/4015* (2013.01); *H04L 65/75* (2022.05)

(58) Field of Classification Search
CPC ....... H04L 65/611; H04L 65/75; H04L 65/40; H04L 65/401; H04L 65/4015
See application file for complete search history.

(56) References Cited

U.S. PATENT DOCUMENTS

| 12,058,189 | B2 | 8/2024 | Miller | |
|---|---|---|---|---|
| 2009/0183220 | A1* | 7/2009 | Amento | ............ H04N 21/4788 725/120 |
| 2009/0249223 | A1* | 10/2009 | Barsook | ................... H04N 7/15 715/753 |
| 2010/0287023 | A1* | 11/2010 | Knobel | ............ G06Q 10/06311 709/204 |
| 2010/0287236 | A1* | 11/2010 | Amento | ................. G06Q 10/10 709/204 |

(Continued)

*Primary Examiner* — Nam T Tran
(74) *Attorney, Agent, or Firm* — The Marbury Law Group, PLLC

(57) ABSTRACT

Systems, methods, and devices for establishing a context-centric shared-viewing party. A processor in a network server may determine content for shared viewing based on inputs received from a user via a user device, and select a context participant group. Each of the user and participants in the selected group may share a commonality with the other participants in that group. The processor may receive complementary context from at least one or more of the user device or user devices of participants in the selected group. The processor may generate a context stream based on the received contextualized content, and send the context stream to the user device.

48 Claims, 24 Drawing Sheets

(56) References Cited

U.S. PATENT DOCUMENTS

| | | | |
|---|---|---|---|
| 2014/0068677 A1* | 3/2014 | Rimon | H04N 21/4788 |
| | | | 725/46 |
| 2014/0344854 A1 | 11/2014 | Kanojia et al. | |
| 2015/0074696 A1* | 3/2015 | Morris | H04L 65/60 |
| | | | 725/12 |
| 2016/0150267 A1 | 5/2016 | Strong | |
| 2018/0367759 A1 | 12/2018 | Barsook et al. | |
| 2019/0320216 A1* | 10/2019 | Liu | H04N 21/4668 |

* cited by examiner

SYSTEM AND METHOD FOR ASYNCHRONOUS USER-CENTRIC CONTEXT-BASED SHARED VIEWING OF MULTIMEDIA

RELATED APPLICATIONS

This application is a continuation of U.S. patent application Ser. No. 17/318,830 filed May 12, 2021, entitled "System and Method for Asynchronous User-Centric Context-Based Shared Viewing of Multimedia", the contents of which are hereby incorporated by reference in its entirety for all purposes.

BACKGROUND

Shared-viewing software applications (e.g., TELEPARTY, etc.) are growing in popularity and use. These shared-viewing software applications allow multiple users to interact with one another online while viewing the same content online. For example, a shared-viewing software application may allow multiple users in different geographical locations to watch and discuss a streaming movie virtually as if the multiple were physically together in a room.

SUMMARY

The various aspects include methods of establishing a context-centric shared-viewing party, including determining, by a network server processor, content for shared viewing based on inputs received from a user via a user device, selecting, by the network server processor, a context participant group (in which each of the user and participants in the selected group share a commonality with the other participants in that group), receiving, by the network server processor, complementary context from at least one or more of the user device, and user devices of participants in the selected group, generating, by the network server processor, a context stream based on the received contextualized content, and sending, by the network server processor, the context stream to the user device.

In an aspect, selecting the context participant group may include selecting at least two context participant groups, each context participant group including one or more participants, each participant being associated with one or more participant devices. In a further aspect, selecting the context participant group may include selecting at least one or more of a publicly accessible context participant group, a private context participant group in which membership to the private group is designated by the user, or a third party platform context participant group in which membership to the third party platform group is designated by a third party entity.

In a further aspect, the method may include a user device receiving a content stream, receiving the context stream, synchronizing the received context stream with the received content steam, overlaying the context and content streams to generate a customized contextualized content overlay stream, and rendering the customized contextualized content overlay stream on an electronic display of the user device. In a further aspect, the method may include the user device storing the customized contextualized content overlay stream for subsequent presentation to the user.

The various aspects also include methods of establishing a context-centric shared-viewing party, including determining, by a network server processor, content for shared viewing based on inputs received from a user via a user device, selecting a context participant group, in which each of the user and participants in the selected group share a commonality with the other participants in that group, requesting and receiving the determined content from a content server, relaying the received determined content to the user device via a user content stream and to the participants in the selected groups via respective participant content streams, receiving complementary context in response to relaying the received content via the user content stream and the respective participant content streams, synchronizing the received complementary context with the received content to generate a customized contextualized content overlay stream that is specific to the user, and sending the customized contextualized content overlay stream to the user device via the user content stream.

In an aspect, the method may include synchronizing complementary context specific to a participant with the received content to generate participant customized contextualized content overlay stream that is specific to that participant, and sending the customized contextualized content overlay stream specific to that participant via the respective participant content streams. In a further aspect, the method may include determining whether the participant that is currently offline or not receiving the respective participant content streams, and storing the customized contextualized content overlay stream specific to that participant for asynchronous consumption in response to determining that the participant is currently offline or not receiving the respective participant content streams. In a further aspect, the method may include storing the customized contextualized content overlay stream for subsequent presentation to the user.

In a further aspect, the method may include determining whether the user device is currently offline or not receiving the user content stream, and storing the customized contextualized content overlay stream for asynchronous consumption in response to determining that the user is currently offline or not receiving the content stream. In a further aspect, the method may include determining whether the user device has come online or requested to receive the user content stream, and commencing sending the stored customized contextualized content overlay stream to the user device in response to determining that the user device has come online or requested to receive the user content stream. In a further aspect, the method may include receiving asynchronous complementary context from the user device in response to commencing the sending of the stored customized contextualized content overlay stream to the user device, and generating and storing updated customized contextualized content overlay stream based on the customized contextualized content overlay stream and the received asynchronous complementary context.

In a further aspect, the method may include sending an alert message to participants in the selected groups to inform them of the availability of updated customized contextualized content overlay stream. In a further aspect, synchronizing the received complementary context with the received content to generate a customized contextualized content overlay stream that is specific to the user may include synchronizing the received complementary context with a real time live event to generate the customized contextualized content overlay stream that is specific to the user. In a further aspect, selecting the context participant group may include selecting at least two context participant groups, each context participant group including one or more participants, each participant being associated with one or more participant devices. In a further aspect, the method may include selecting the context participant group includes selecting at least one or more of a publicly accessible context participant group, a private context participant group in which membership to the private group is designated by the user, or a third party platform context participant group in which membership to the third party platform group is designated by a third party entity.

The various aspects also include methods of receiving a context-centric shared-viewing party via a user equipment (UE) device, including selecting, by a UE processor, content for shared viewing based on inputs received from a user of the UE device, selecting a context participant group based on additional inputs received from the user of the UE device, in which each of the user and participants in the selected group share a commonality with the other participants in that group, receiving a user content stream that includes the selected content, and receiving an updated user content stream that includes customized contextualized content overlay stream that includes the selected content synchronized with complementary context generated by participants in the selected group.

In a further aspect, the method may include generating user complementary context after receiving the user content stream that includes the selected content, and sending the generated user complementary context to a network server, in which receiving the updated user content stream that includes customized contextualized content overlay stream that includes the selected content synchronized with the complementary context generated by the participants in the selected group including receiving the updated user content stream that includes customized contextualized content overlay stream that includes the selected content synchronized with both the generated user complementary context and the complementary context generated by the participants in the selected group. In a further aspect, the method may include generating user complementary context after receiving the updated user content stream that includes customized contextualized content overlay stream, sending the generated user complementary context to a network server, and receiving another updated user content stream that includes customized contextualized content overlay stream that includes the selected content synchronized with both the generated user complementary context and the complementary context generated by the participants in the selected group.

Further aspects may include a computing device (e.g., network server computing device, user equipment device, etc.) having a processor configured with processor-executable instructions to perform various operations corresponding to the methods discussed above.

Further aspects may include a non-transitory processor-readable storage medium having stored thereon processor-executable instructions configured to cause a processor (e.g., network server processor, user device processor, etc.) to perform various operations corresponding to the method operations discussed above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1:
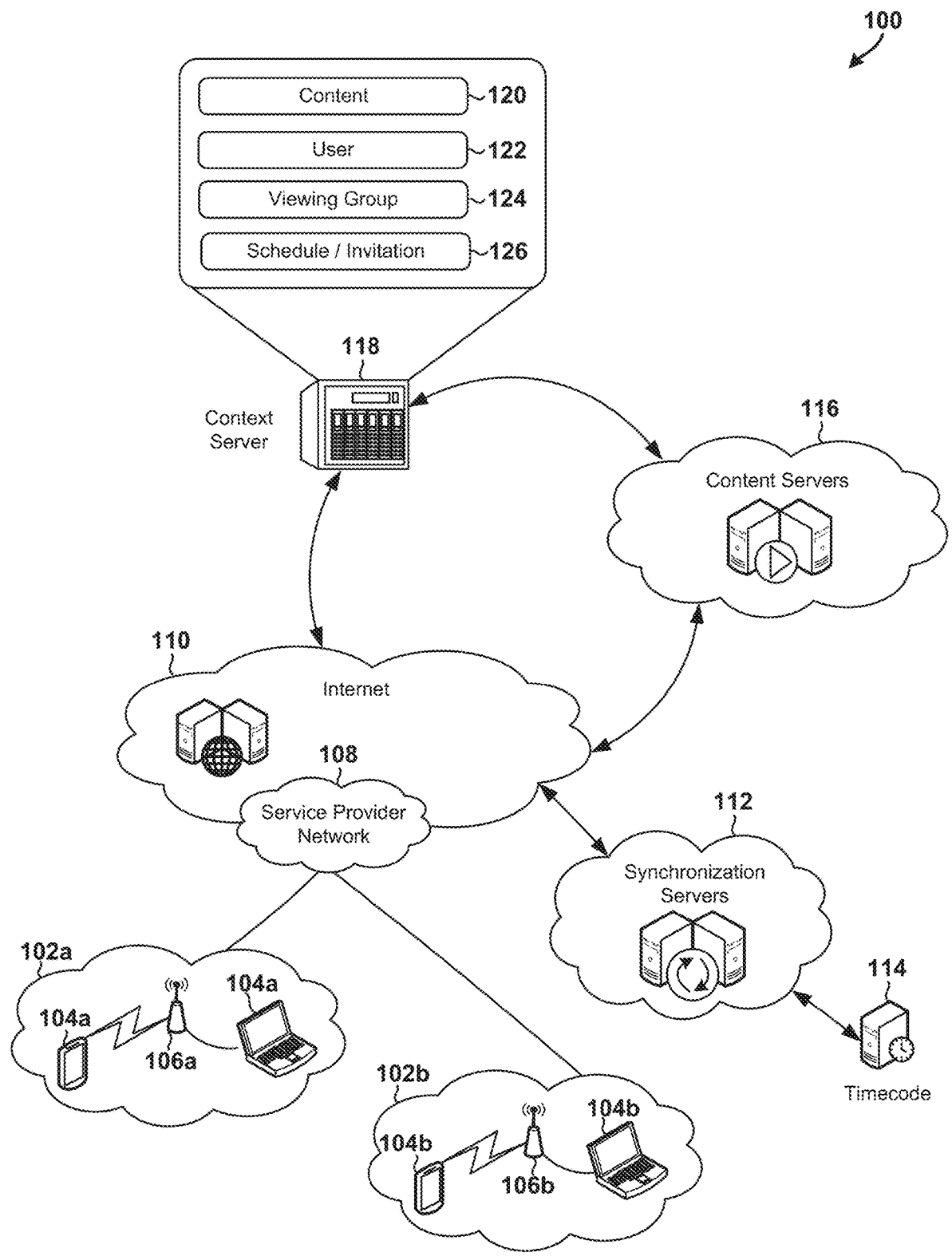
FIG. 1 is a block diagram of an example communication system suitable for implementing a user-centric or context-centric shared-viewing software application in accordance with some embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "service provider network" is used generically herein to refer to any network suitable for providing consumers with access to the Internet or IP services over broadband connections, and may encompass both wired and wireless networks/technologies. Examples of wired network technologies and networks that may be included within a service provider network include cable networks, fiber optic networks, hybrid-fiber-cable networks, Ethernet, local area networks (LAN), metropolitan area networks (MAN), wide area networks (WAN), networks that implement the data over cable service interface specification (DOCSIS), networks that utilize asymmetric digital subscriber line (ADSL) technologies, etc. Examples of wireless network technologies and networks that may be included within a service provider network include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), Bluetooth®, land mobile radio (LMR), and integrated digital enhanced network (iden). Each of these wired and wireless technologies involves, for example, the transmission and reception of data, signaling and/or content messages.

Any references to terminology and/or technical details related to an individual wired or wireless communications standard or technology are for illustrative purposes only, and not intended to limit the scope of the claims to a particular communication system or technology unless specifically recited in the claim language.

The term "user equipment (UE)" may be used herein to refer to any one or all of satellite or cable set top boxes, laptop computers, rack mounted computers, routers, cellular telephones, smart phones, personal or mobile multi-media players, personal data assistants (PDAs), customer-premises equipment (CPE), personal computers, tablet computers, smart books, palm-top computers, desk-top computers, wireless electronic mail receivers, multimedia Internet enabled cellular telephones, wireless gaming controllers, streaming media players (such as, ROKU®, AppleTV®, Amazon FireStick®), smart televisions, digital video recorders (DVRs), modems, routers, network switches, residential gateways (RG), access nodes (AN), bridged residential gateway (BRG), fixed mobile convergence products, home networking adapters and Internet access gateways that enable consumers to access communications service providers' services and distribute them around their house via a local area network (LAN), and similar electronic devices which include a programmable processor and memory and circuitry for providing the functionality described herein.

The terms "component," "system," and the like may be used herein to refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Despite the convenience of on-demand video streaming capabilities, users often seek the camaraderie and companionship that may be experienced through a shared viewing experience. Conventional solutions typically accomplish this by creating a virtual room, adding the users/participants to the virtual room, and rendering content in the virtual room so that all of the users/participants view the content at the same time. Users may interact with one another via text comments or in some instances video and/or audio chat windows. This creates a room-centric user experience that mimics a user experience in which all participants are physically in the same room (i.e., a traditional viewing party). Yet, there are a number of limitations to this room-centric approach. For example, the room-centric approach does not allow each user to view the content along with customized, unique, or different context. Put another way, in the room-centric approach, a user may experience the shared-viewing experience through the singular commonality of a shared room. The room-centric approach does not allow each user to customize their viewing experience with private, public and third party context that is relevant to only a limited number of participants in the shared room without sharing such customized viewing experience with the entire room.

User-centric or context-centric shared-viewing software applications may overcome many of the limitations of room-centric applications, and would be beneficial to content providers, service provider networks, and consumers of shared-viewing software applications. Various embodiments seek to provide a user-centric or context-centric shared-viewing party experience to users.

FIG. 1 is a simplified example of a network 100 that may be used to implement various embodiments. In the example illustrated in FIG. 1, the network 100 may include a local area networks (LAN) 102a, 102b that includes user equipment (UE) devices 104a, 104b coupled to a respective customer premise equipment (CPE) 106a, 106b component/device via wired or wireless communication links. Generally, a CPE 106a, 106b may include a cable modem, digital subscriber line modem, router, switch, firewall, packet filter, wireless access point, and/or a residential gateway that provide network connectivity to home or small office network. That is, the CPE 106a, 106b may allow UE devices 104a, 104b on the respective LAN 102a, 102b to connect to a service provider network 108 and ultimately the Internet 110.

The network 100 may also include synchronization servers 112, a timecode 114 component, content servers 116, and a context server 118. The context server may include a content component 120, a user component 122, a viewing group component 124, and a schedule/invitation component 126, any or all of which may be configured to implement embodiment methods of providing a context-centric shared-viewing viewing party experience.

The context server 118 may be configured to create, establish or provide users with a context-centric shared-viewing viewing party experience. In some embodiments, this may be accomplished by the context server 118 selecting to receive content 120 from the content servers 116, and complementing the selected content 120 with context received from users through their respective UE devices 104a, 104b. In other embodiments, the context server 118 may first determine the context, and select the content 120 to receive from the content servers 116 based on the selected context. The context server 118 may determine context based on the user 122, viewing group 124 (e.g., a family group, college friends group, coworker group, Monty Python fans group, etc.) and/or schedule 126. The context server 118 may be configured to provide, support or allow online and/or offline user engagements.

In some embodiment, the context server 118 may provide users with a context-centric shared-viewing viewing party experience by performing operations that include selecting content to receive from the content server 116 for the user, selecting one or more groups of context participants for the user, and commencing to receive and relay the selected content from the content servers 116 to user devices 104 associated with user and the participants in the selected groups. The context server 118 may commence to receive complementary context (e.g., audio, video, text, etc.) from the user devices (e.g., 104a, 104b) as the users view and engage with the content. The context server 118 may generate a customized contextualized content overlay stream that synchronizes, combines, overlays and/or augments the content received from the content servers 116 with the complementary context received from the user devices (e.g., 104a, 104b), and commence sending the generated customized contextualized content overlay stream to user devices (e.g., 104a, 104b) associated with the user and the participants in the selected context groups (e.g., in lieu of relaying the received content, etc.).

In some embodiments, the context server 118 may be configured to generate and store a customized contextualized content overlay stream for each user and each participant in the selected context group. Each of the customized contextualized content overlay streams may be customized for a specific user. For example, the context server 118 may generate and store a customized contextualized content overlay stream that is customized for a user based on that user's profile, selected context groups, or other factors used to determine context. Each customized contextualized content overlay stream may synchronize the complementary context with the content received from the content servers 116.

As mentioned above, the context server 118 may select one or more groups of context participants for the user. Each group of context participants may include one or more participants, and each participant in the group may share a commonality with every other participant in that group (e.g., members of the same family or social group, subscribers to same services, have share friends on social media, etc.). The system may determine the commonalities based on the information included in each user's profile (e.g., family, group membership, viewing habits, etc.). A commonality may be any trait or data associated with the participants other than that they decided to watch content together. Put another way, the commonality may be a trait or data associated with the participants prior to the establishment of a shared-viewing experience.

In some embodiments, the context server 118 may receive complementary context from one or more participants in selected groups of context participants, and relay the complementary context to one or more device (e.g., 104a, 104b) associated with each participant in each selected group of context participants. The complementary context may be synchronized with the shared viewing content and/or may include time-stamped or time-synchronized audio, video or text-based information.

The participants in a selected group may be members of a publicly accessible group, members of a private group, or members of a third party platform group. Membership to a public group may be designated by each of the public groups members. Membership to the private group may be designated by the user, and membership to the third party platform group may designated by a third party.

In some embodiments, the context server 118 may be configured to determine whether any participants in the selected groups of context participants are currently offline. The context server 118 may store the selected content in conjunction with timestamps and complementary context for each offline participant. Alternatively or in addition, the context server 118 may store the customized contextualized content overlay stream for asynchronous consumption by an asynchronous context participant in response to determining that at least one participant is currently offline.

In some embodiments, the context server 118 may be configured to receive complementary context from the asynchronous context participant, and supplement the first contextualized selected content stream with the received complementary context from the asynchronous context participant to form a supplemented contextualized selected content stream.

In some embodiments, the synchronization servers 112 may synchronize the complementary context from the asynchronous context participant with the complementary context from the synchronous context participant.

In some embodiments, the context server 118 may be further configured to alert the selected first group of context participants of the supplemented contextualized selected content stream.

In some embodiments, the context server 118 may be further configured to select a second group of context participants. Each of the second group of context participants may share a second commonality with other participants of the selected second group of context participants other than the shared viewing party, and the second commonality may different from the first commonality. The context server 118 may relay the selected content for shared viewing to each of the second group of context participants, receive complementary context from each of the selected second group of context participants, and synchronize the received complementary context from each of the selected second group of context participants with the relayed shared content to form a second contextualized selected content stream.

As mentioned above, the context server 118 may generate a customized contextualized content overlay stream that synchronizes, combines, overlays and/or augments the content received from the content servers 116 with the complementary context received from the user devices (e.g., 104a, 104b). In some embodiments, the selected/received content may include a real time live event (e.g., live sporting/entertainment event, live news coverage, etc.). In some embodiments, the context server 118 may time synchronize the complementary context with the real time live event and/or generate a second or updated customized contextualized content overlay stream for the user in which the complementary context is time synchronized with the real time live event. The context server 118 may synchronize and store any or all of the complementary context, received content (e.g., real time live event, etc.), and updated customized contextualized content overlay stream in memory for subsequent presentation to the user and other context group participants.

Figure 2A:
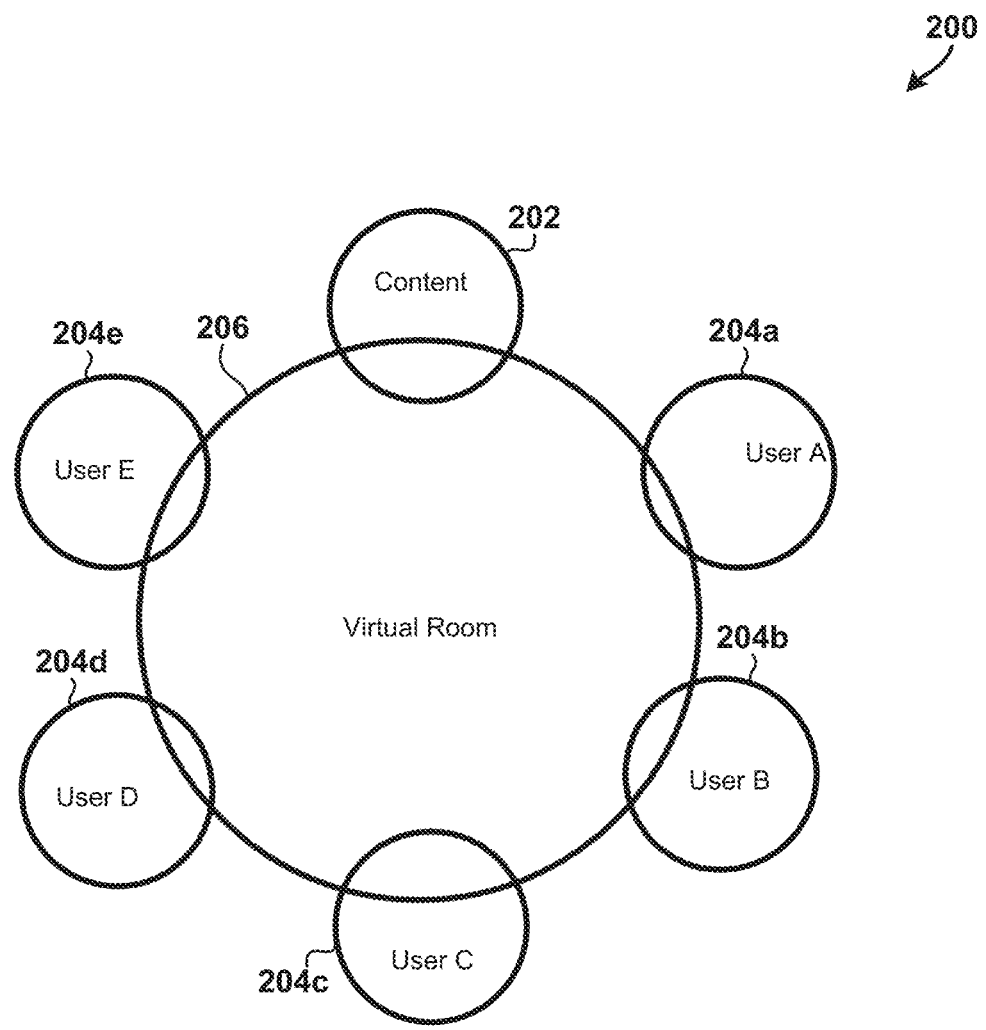
FIG. 2A is a block diagram illustrating the relationships between components in a virtual room-centric shared-viewing software application.

FIG. 2A illustrates an example viewing party 200 or presentation object that may generated by a room-centric shared-viewing software application. In the example illustrated in FIG. 2A, the viewing party 200 includes a content 202 element (e.g., a video stream, etc.), a plurality of users 204 (i.e., users 204a-e), and a virtual room 206. The main content 202 and the plurality of users 204a-e are organized around the virtual room 206, which creates a user experience that may be virtually analogous to an instance when all the viewers of the content 202 are physically present in the same room (i.e., a traditional viewing party). All of the users 204a-204e may view the same content 202 together in real-time as long as they remain together in the virtual room 206. To view different or alternative content, various users 204a-204e would have to leave virtual room 206 and enter into a different virtual room.

Users 204a-204e may connect to the virtual room 206, where their content 202 is time-synchronized. User engagements may come in the form of chat, voice, or video as the users 204a-204e view or otherwise consume the content 202. This "complementary context" (i.e., user engagements in the of chat, voice, or video) may be shared with all of the users 204a-204e in the virtual room 206, and may be stored and retrieved later.

Because the virtual room 206 is the primary organizing object of the viewing party 200, the virtual room 206 mimics a physical construct (e.g., a movie-theater or living room), and creates a similar viewing experience for all users 204a-204e, the virtual room 206 may limit the user's 204a-204e individual flexibility, efficiency, and customization. For example, the users 204a-204e may not have any options for partitioning or separating users so that they are not all in the same group and/or may not be able to customize their viewing experience while keeping their groups separate. Rather, all users in the same virtual room 206 are bound together in the same group via the virtual room 206 regardless of their individual relationships to one another. For example, all of the users 204a-204e may be friends with the organizer of the virtual room 206, but may not know one another. Regardless of their individual interests and orientation to the virtual room 206, all of the users 204a-204e may have the same viewing experience, and any customization occurs at the room level (not at the user level). To receive stored content from multiple groups, the users 204a-204e would have to watch the content more than once— essentially once per multiple group in different multiple virtual rooms.

Figure 2B:
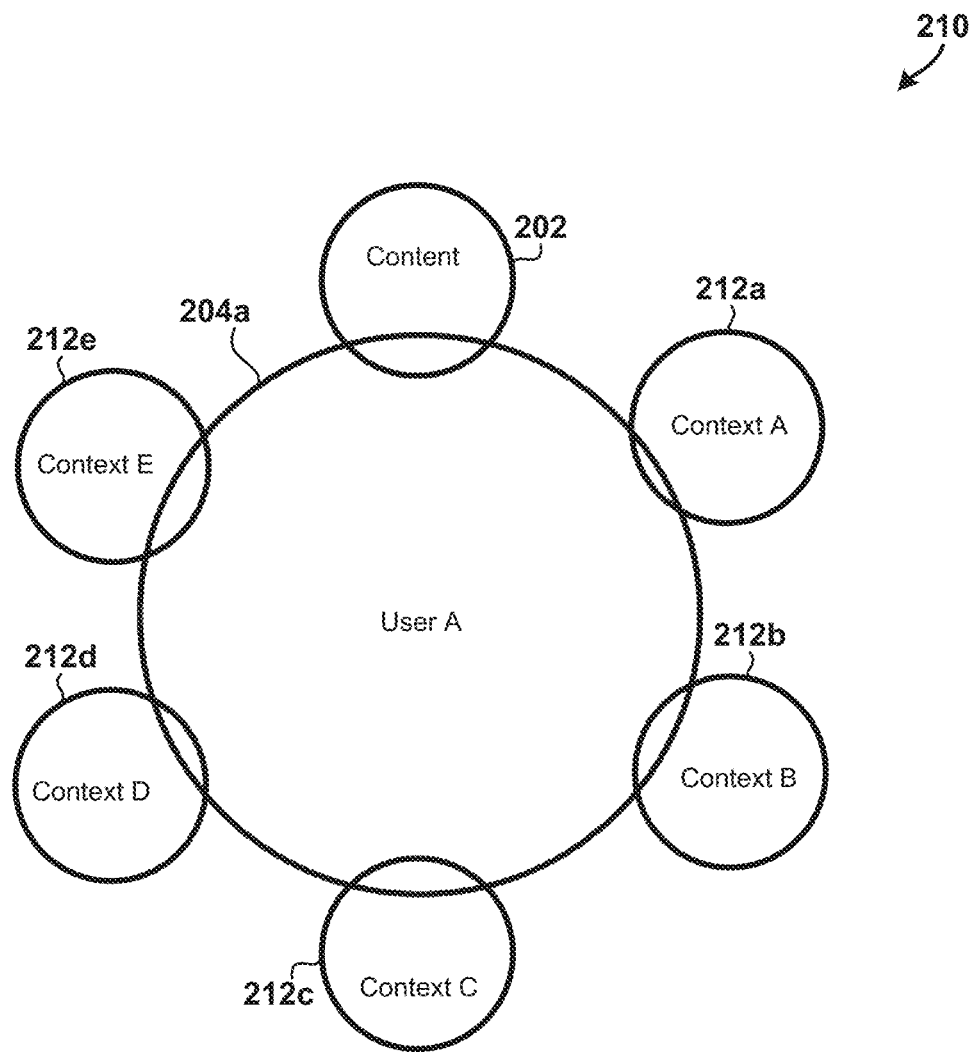
FIG. 2B is a block diagram illustrating the relationships between components in a user-centric shared-viewing software application.

FIG. 2B illustrates an example viewing party 210 or presentation object that may generated by a user-centric shared-viewing software application configured in accordance with various embodiments. Similar to the example illustrated in FIG. 2A, the viewing party 210 illustrated in FIG. 2B includes the content 202 (e.g., a video stream, etc.) and a user 204a (User A). However, unlike the example illustrated in FIG. 2A, the viewing party 210 includes a plurality of context 212a-212e elements, and the content 202 and context 212a-212e elements may be organized around the user 204a. Each of context 212a-212e may be organized according to a specific context that the organizer user 204a may establish. For example, context 212a may consist of the user 204a's work friends. Context 212b may consist of user 204a and user 204a's college friends. Context 212c may consist of user 204a and user 204a's hobby club. Context 212d may consist of user 204a and members of a fan group that user 204a belongs. Context 212e may consist of user 204a and user 204a's family member. Said another way, the viewing party 210 illustrated in FIG. 2B removes the virtual room (e.g., room 206 illustrated in FIG. 2A) as the central or primary organizing object, and replaces it with the user 204a. This allows the user 204a to layer context 212a-212e and control how to complement his or her viewing experience. In this manner, the context and exchange between each context 212a-212e group may be customized and tailored to each context 212a-212e group without infringing on the context of another context 212a-212e. Inappropriate comments that may be permissible or acceptable among members of an adult context group may be received and added, overlaid on one customized contextualized content overlay stream without the potential of offending a user's family members that are participants of a separate family context group that may consume a separate customized contextualized content overlay stream (i.e. context 212b vis-a-vis context 212e). Nevertheless, all context groups 212a-212e may have a shared viewing experience with user 204a through each individual context group 212a-212e.

The context 212a-212e may include shared viewing with several users viewing in time sync. Alternatively or in addition, the context 212a-212e may include stored data from a user or group of users that have already viewed the content, leaving behind complementary context. That is, when or how the context 212 was/is created becomes irrelevant. The customized contextualized content overlay stream for a particular context group 212 may be stored and available to complement the content 202 further with complementary context as needed and as appropriate for each individual context 212a-212e.

Figure 3A:
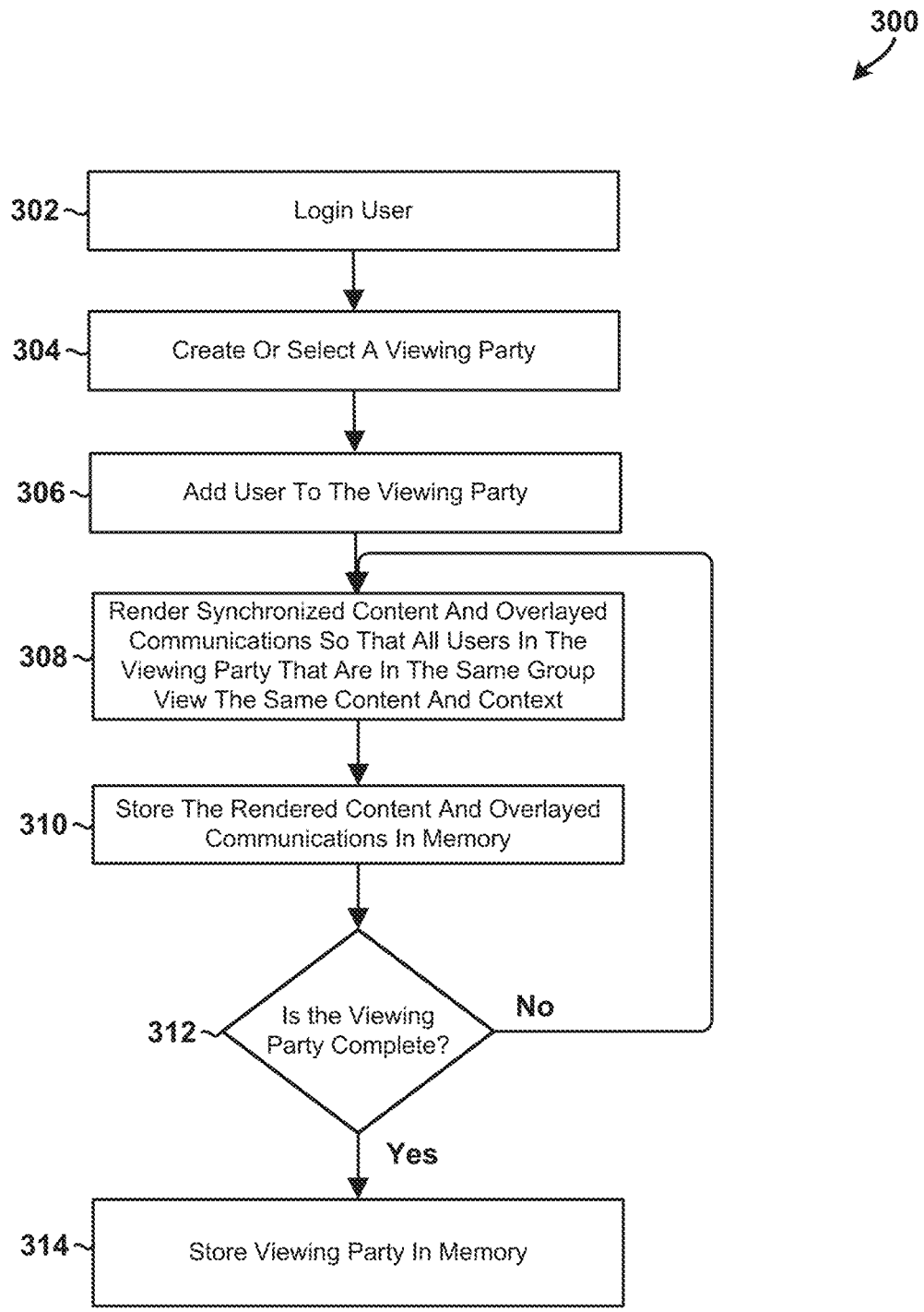
FIGS. 3A and 3B are process flow diagrams illustrating methods of providing a room-centric shared-viewing viewing party.
Figure 3B:
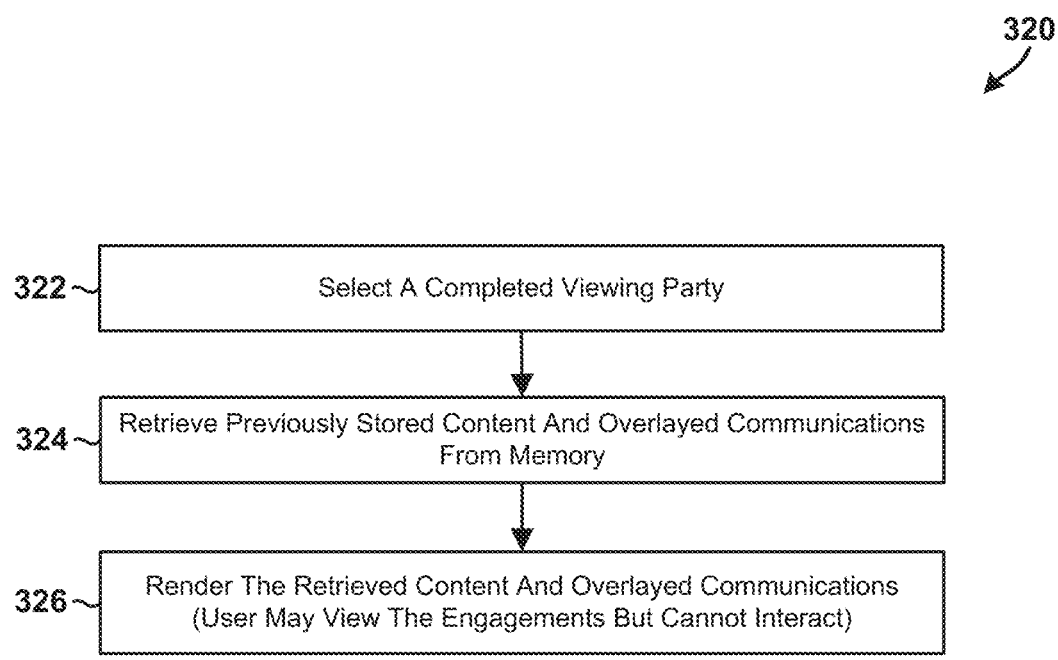

FIGS. 3A and 3B illustrate methods 300, 320 for providing a room-centric shared-viewing viewing party (e.g., viewing party 200 illustrated in FIG. 2A). Methods 300, 320 may be performed by a processor in a network server. In some embodiments, method 320 may be performed after the completion of method 300.

With reference to FIG. 3A, in block 302, the network server processor may launch the viewing party application and log the user in. In block 304, the network server processor may create or select a viewing party for the user (e.g., based on inputs/selections received from the user). In block 306, the network server processor may add a participant to the viewing party room. In block 308, the network server processor may relay the selected content to each added participant and receive complementary context from each added participant. In block 310, the network server processor may render synchronized content and overlayed communications so that all participants in the viewing party room that are in the same group may view the same content and context. In block 312, the network server processor may store the rendered content and overlayed communications in memory.

In determination block 312, the network server processor may determine whether the viewing party has been completed (e.g., ended, terminated, etc.). In response to determining that the viewing party has not completed (i.e., determination block 312="No"), the network server processor may continue relaying content and receiving complementary context to synchronize, present and store in blocks 308-312. In response to determining that the viewing party has completed (i.e., determination block 312="Yes"), the network server processor may mark the viewing party as complete and store the completed viewing party in memory in block 314. In some embodiments, the network server processor may store the completed viewing party in memory in association with the content and overlayed communications stored in block 310.

With reference to FIG. 3B, in block 322, the network server processor may select a completed viewing party stored in memory (e.g., stored as part of block 314 in FIG. 3A). In block 324, the network server processor may retrieve the selected completed viewing party and its associated previously stored content and overlayed communications from memory. In block 326, the network server processor may render the retrieved content and overlayed communications. The participant may view the engagements but not interact with them or otherwise create new engagements.

Figure 4A:
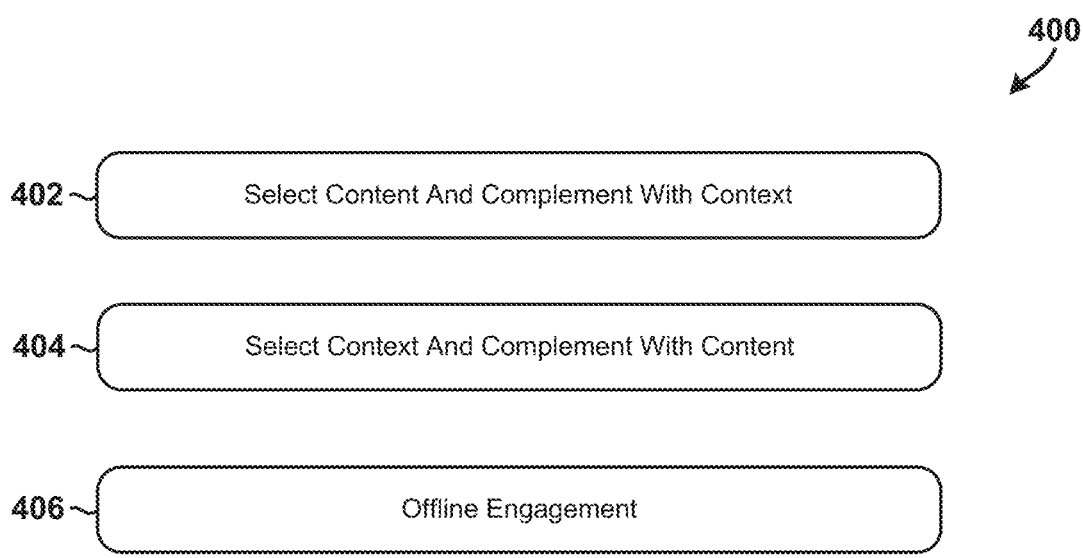
FIGS. 4A, 4B and 4C are process flow diagrams illustrating methods of providing a context-centric shared-viewing viewing party.
Figure 4B:
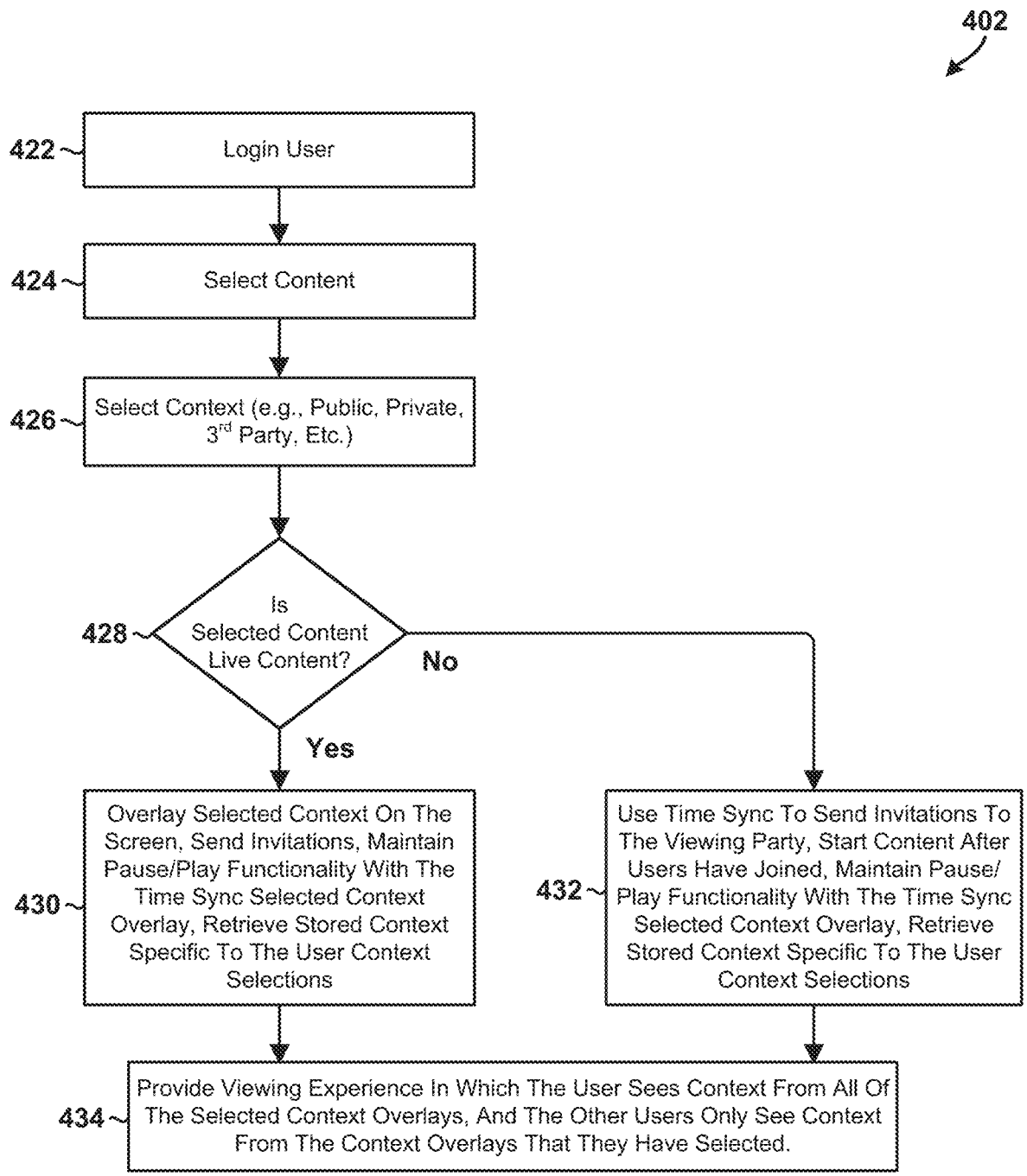
Figure 4C:
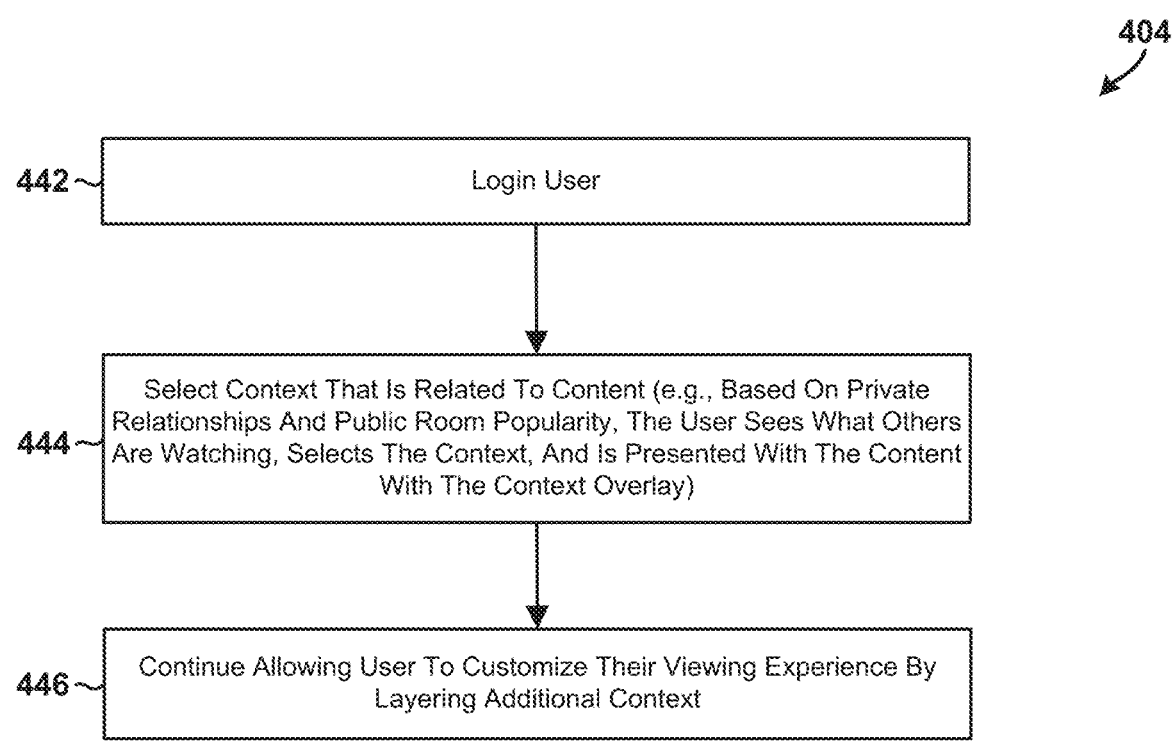

FIGS. 4A, 4B and 4C illustrate a method 400 for providing a context-centric shared-viewing viewing party (e.g., viewing party 210 illustrated in FIG. 2B). Method 400 may be performed by one or more processors in one or more network servers (e.g., servers 112, 116 and 118, etc.).

With reference to FIG. 4A, in block 402, the network server processor may browse for content and complement it with context. In block 404, the network server processor may browse for context and complement it with content. In block 406, the network server processor may provide or allow for offline engagements.

FIG. 4B illustrates operations that may be performed by the network server processor in block 402 to browse for content and complement it with context. In block 422, the network server processor may log the user (context organizer) into the system. In block 424, the network server processor may select the content based on user selection inputs. In block 426, the network server processor may select context based on user selection inputs (e.g., public, private, 3rd Party, etc.).

In determination block 428, the network server processor may determine whether the selected content is live content or on-demand content. In response to determining that selected content is live content (i.e., determination block 428="Yes"), the network server processor may overlay selected complementary context on the screen, send invitations, maintain pause/play functionality with the time sync selected context overlay, and retrieve stored context specific to the user context selections in block 430. In response to determining that selected content is not live content (i.e., determination block 428="No"), the network server processor may use time sync to send invitations to the viewing party, start content after users have joined, maintain pause/play functionality with the time sync selected context overlay, and retrieve stored context specific to the user context selections in block 432. In block 434, the network server processor may provide a viewing experience in which the user sees context from all of the selected context overlays, and the other users only see context from the context overlays that they have selected.

FIG. 4C illustrates operations that may be performed by the network server processor in block 404 to browse for context and complement it with content. In block 442, the network server processor may log the user into the system. In block 444, the network server processor may select context that is related to content. For example, based on private relationships and public room popularity, the user may see what others are watching. The user may select the context. In response, the network server processor may render the selected content with the context overlay. In block 446, the network server processor may continue allowing the user to customize his or her viewing experience by layering additional context.

Figure 5A:
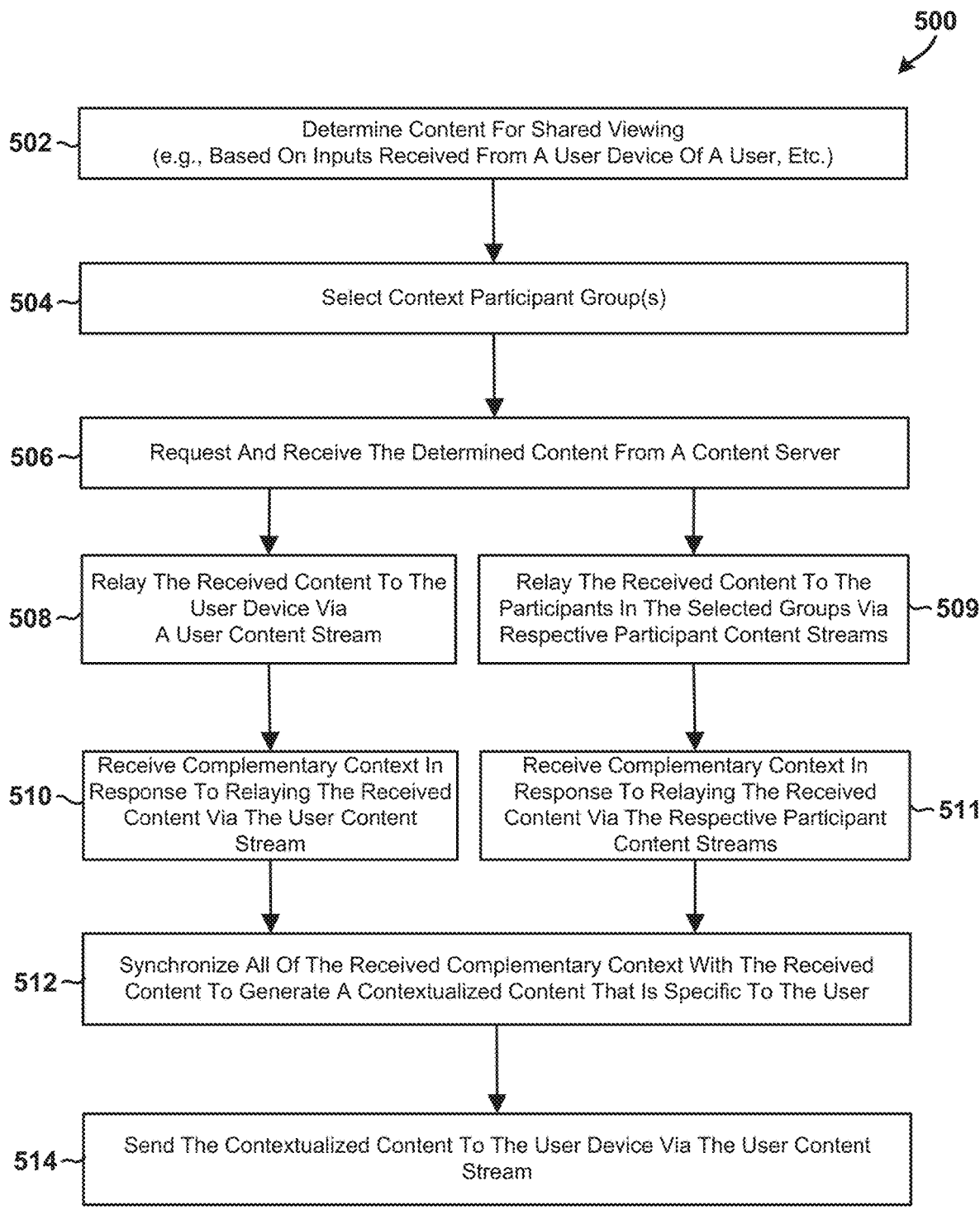
FIG. 5A is a process flow diagram illustrating method that may be performed by a network server for establishing a context-centric shared-viewing viewing party in accordance with some embodiments.

FIG. 5A illustrates a method 500 for establishing a context-centric shared-viewing viewing party in accordance with some embodiments. Method 500 may be performed by one or more processors in one or more network servers (e.g., context server 118 illustrated in FIG. 1, etc.).

In block 502, the network server processor may determine content for shared viewing (e.g., based on inputs received from a user via a user device, etc.). In block 504, the network server processor may select a context participant group. Each of the user and participants in the selected group may share a commonality with the other participants in that group (a commonality other than the selected content or shared viewing party). In some embodiments, the network server may select at least two context participant groups. Each context participant group may include one or more participants, and each participant may be associated with one or more user devices. In some embodiments, at least one of the selected context participant groups may be a publicly accessible context participant group, a private context participant group in which membership to the private group is designated by the user, or a third party platform context participant group in which membership to the third party platform group is designated by a third party entity.

In block 506, the network server processor may request and receive the determined content from a content server. In blocks 508 and 509, the network server processor may relay the received content. The network server processor may relay the received content to the user device via a user content stream. The network server processor may also relay the received content to the participants in the selected groups via respective participant content streams.

In blocks 510 and 511, the network server processor may receive complementary context in response to relaying the received content via the user content stream and the respective participant content streams. In block 512, the network server processor may synchronize any or all of the received complementary context (e.g., from the user or the participants) with the received content to generate a contextualized content that is specific to the user. That is, the contextualized content may include a combination of content elements that are specific or unique to user.

In block 514, the network server processor may send the contextualized content to the user device via the user content stream.

Figure 5B:
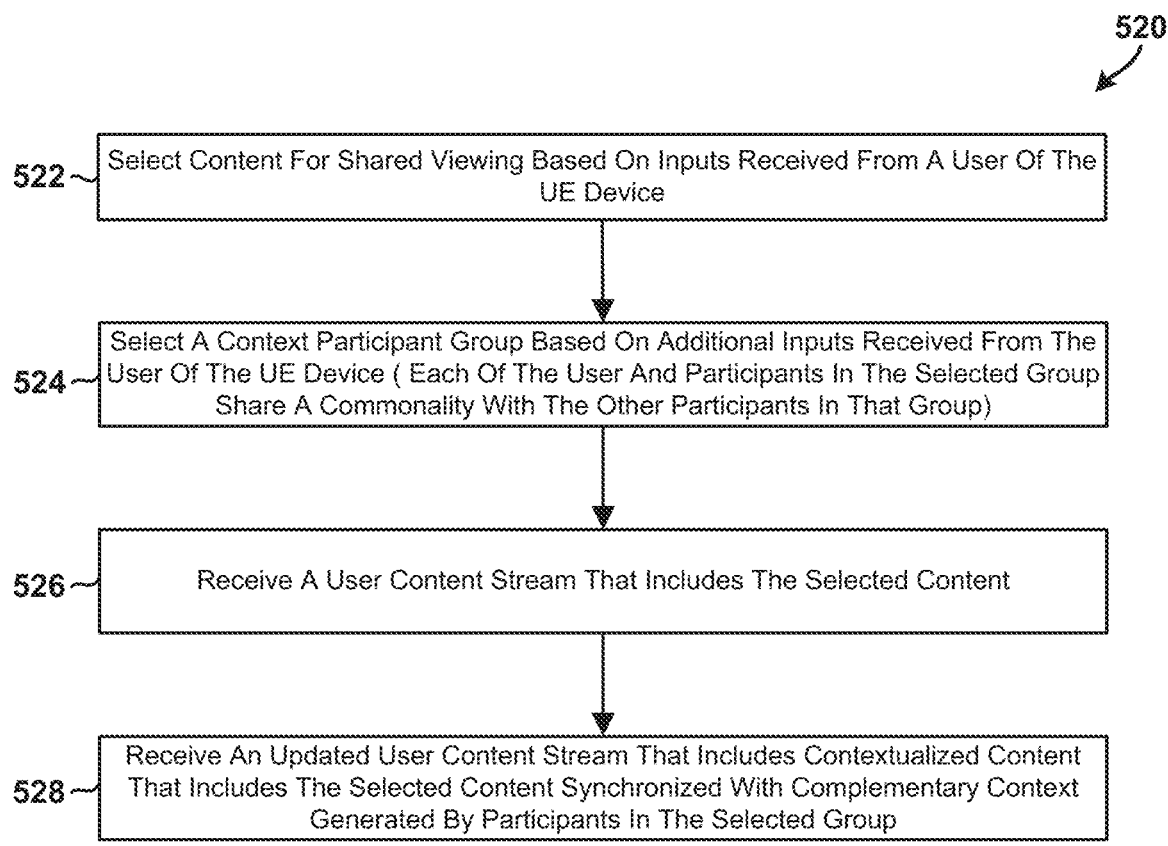
FIG. 5B is a process flow diagram illustrating method that may be performed by a user device for establishing a context-centric shared-viewing viewing party in accordance with some embodiments.

FIG. 5B illustrates a method 520 for participating a context-centric shared-viewing viewing party in accordance with some embodiments. Method 520 may be performed by a processor in a UE device.

In block 522, the UE device may select content for shared viewing based on inputs received from a user of the UE device. In block 524, the UE device may select a context participant group based on additional inputs received from the user of the UE device (each of the user and participants in the selected group share a commonality with the other participants in that group). In block 526, the UE device may receive a user content stream that includes the selected content. In block 528, the UE device may receive an updated user content stream that includes contextualized content that includes the selected content synchronized with complementary context generated by participants in the selected group.

Figure 6:
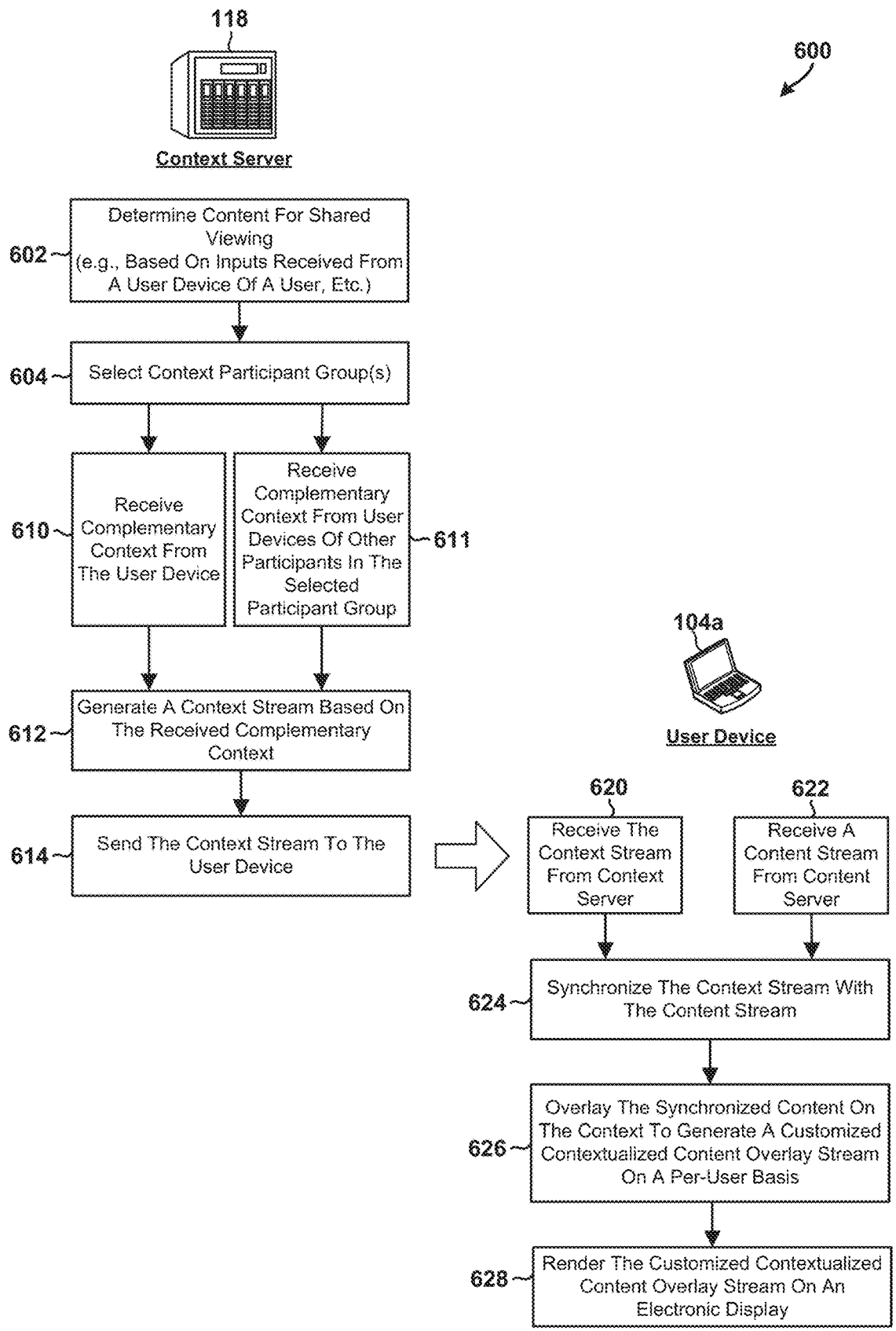
FIG. 6 is a process flow diagram illustrating another method for establishing a context-centric shared-viewing viewing party in accordance with some embodiments.

FIG. 6 illustrates a method 600 for establishing a context-centric shared-viewing viewing party in accordance with some embodiments. Method 600 may be performed by a network server processor in the context server 118 and/or a user device processor in a user device 104a.

In block 602, the network server processor may determine content for shared viewing based on inputs received from a user device. In block 604, the network server processor may select a context participant group (e.g., in which each of the user and participants in the selected group share a commonality with the other participants in that group other than the selected content or shared viewing party). In block 610, the network server processor may receive complementary context from the user device. In block 611, the network server processor may receive complementary context from other user devices in the context participant group. In block 612, the network server processor may generate a context stream based on the received complementary context. In block 614, the network server processor may send the generated context stream to the user device.

In block 620, the user device processor may receive the context stream from the context server 118. In block 622, the user device processor may receive a content stream from a content server (e.g., content servers 116 illustrated in FIG. 1, etc.). In block 624, the user device processor may synchronize the received context stream with the received content stream. In block 626, the user device processor may overlay the context onto the content to generate a customized contextualized content overlay stream on a per-user basis. In block 628, the user device processor may render the customized contextualized content overlay stream on an electronic display of the user device 104a.

Thus, in some embodiments, outside of synchronization and group controls of the pause/play/stop functionality, streaming the content (e.g., in block 622) uses conventional techniques, with each end-user device streaming the content from the content server. The context stream (e.g., stream generated in block 614 and received by the user device in block 620) complements the content stream and is interwoven accordingly based on the content and context stream timestamp (asynchronous).

Figure 7:
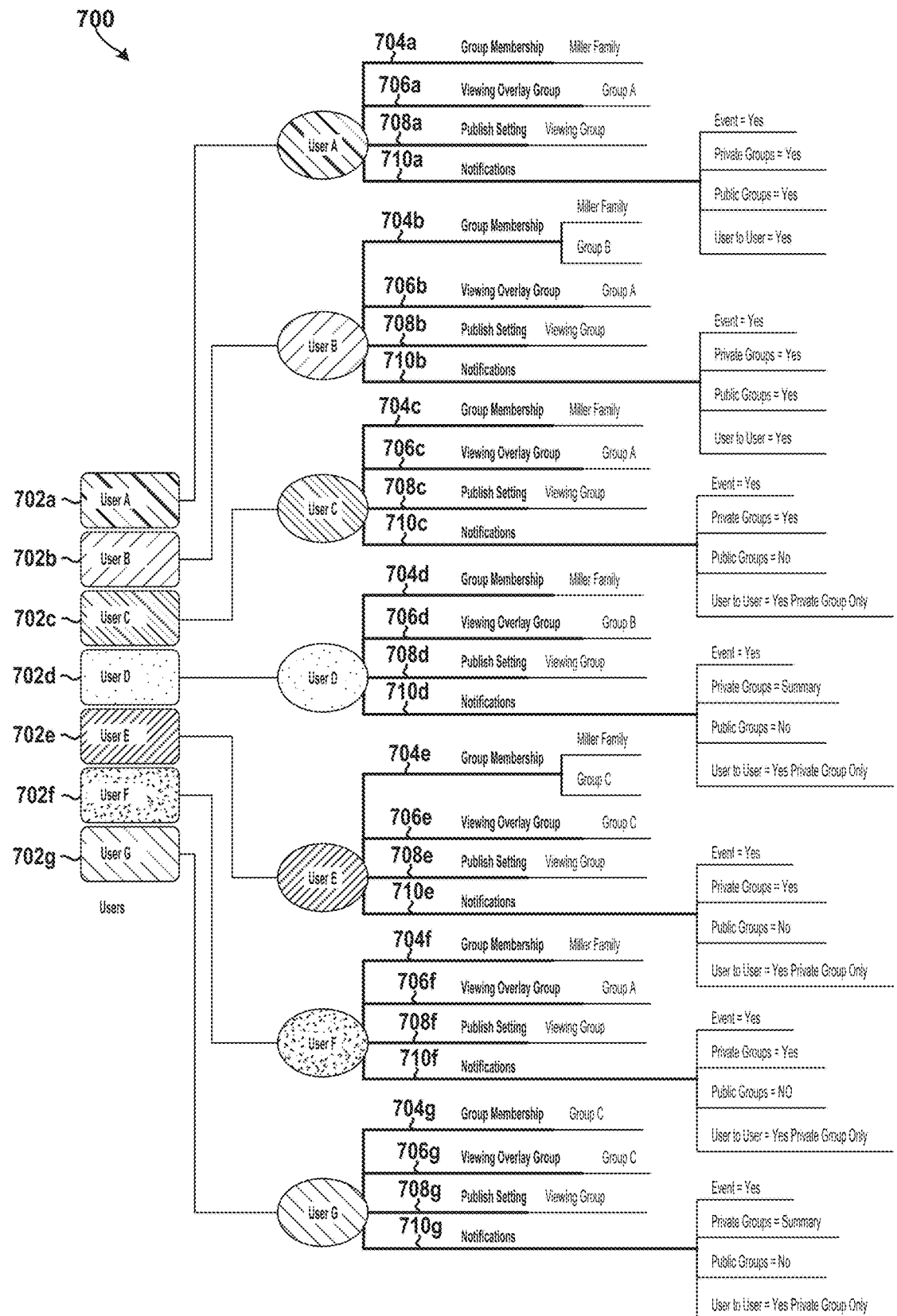
FIG. 7 illustrates components in a user information structure that could be used to establish, use and/or provide a context-centric shared-viewing viewing party in accordance with the embodiments.

FIG. 7 illustrates a user information structure 700 that could be used by devices configured in accordance with the embodiments to establish, use and/or provide a context-centric shared-viewing viewing party. In the example illustrated in FIG. 7, the information structure 700 includes a record 702 for each user (User A-G). Each record 702a-g includes a group membership information element (IE) 704, a viewing overlay group IE 706, a published setting IE 708, and a notifications IE 710. Each notifications IE 710a-g includes an event IE, private groups IE, public groups IE, and a user-to-user IE.

As shown in the example of FIG. 7, group membership IEs 704a-f indicate that users A-F are members of Group A or "the Miller Family." Group membership IE 704b indicates that user B is both a member of Group A (the Miller Family) and Group B. Group membership IE 704e indicates that user E is both a member of the Group A (Miller Family) and Group C. Group membership IE 704g indicates that user G is only a member Group C. Each of the groups A-C may include one or more participants, and each participant in each group may share a commonality with every other participant in that group.

In the example illustrated in FIG. 7, the viewing overlay group IEs 706a, 706b, 706c and 706f indicate that the users A, B, C and F are associated with viewing overlay group A. Viewing overlay group IE 706d indicates that user D is associated with viewing overlay group B. The viewing overlay group IEs 706e and 706g indicate that the users E and G are associated with viewing overlay group C. As such, users A, B, C and F view the group A overlay, user D views the group B overlay, and users E and G view the group C overlay.

The published setting IEs 708a-g indicate that users A-G are all part of a viewing group.

The user-to-user IEs 710a-g indicate the notification preferences of their respective users.

Said another way, FIG. 7 is a visual depiction of the settings and memberships that accompany a user profile which drive their experience as they layer context streams. These settings, along with when and with whom they viewed the content, may ultimately determine the user experience. To focus the discussion on the flexibility of the user-centric approach, four flows built around the seven users (users A-F) highlight the individualized context stream and viewing experience of each user based on their settings, viewing partners, and time at which they watched.

Users A-F are part of Group A (Miller Family). User B is also a member of group B. User E has an additional membership to Group C. User G is only a member of group C.

As mentioned above, the group membership IEs 704 identify the group or groups to which a user belongs. A group is a mechanism to organize several users into a single context stream. This is a similar construct to how a traditional viewing party is, with all parties in a group viewing each other's context. A user may be part of multiple groups, and groups can be further organized based on their relationship to content.

The viewing overlay group IEs 706 are settings that streamline the context stream during content viewing. The viewing overlay group IEs 706 could be selected to all or pruned to a group of or a single context stream.

The published setting IEs 708 are settings that streamline the publishing of context during content viewing. This could be set to all context streams or set to a subset of/or a single context stream. For example, if you are viewing with two context streams (your family and your friends), you might have an engagement intended for one and not the other.

The notifications IEs 710 may be user to further control the viewing experience by pruning the context timeline, which would/could be further layered with settings applicable to each context stream that was selected.

Each notifications IE 710a-g includes an event IE, private groups IE, public groups IE, and a user-to-user IE. The event IE may toggle receiving or muting new events in the timeline from your live context group. For example, the context stream becomes invasive, the users can't concentrate on the content, or somebody joins a user physically to watch, and they don't want messages popping up that they shouldn't be privy to.

The private groups IE may be used to further specify the private group category with options to present asynchronous engagements from the private group(s) to be presented in summary at the end of the episode rather than within the context timeline.

The public groups IE may be used to further control the public group category.

The user-to-user IE may be part of multi-user contextual groups, and could allow direct messaging separate from the context group.

Figure 8:
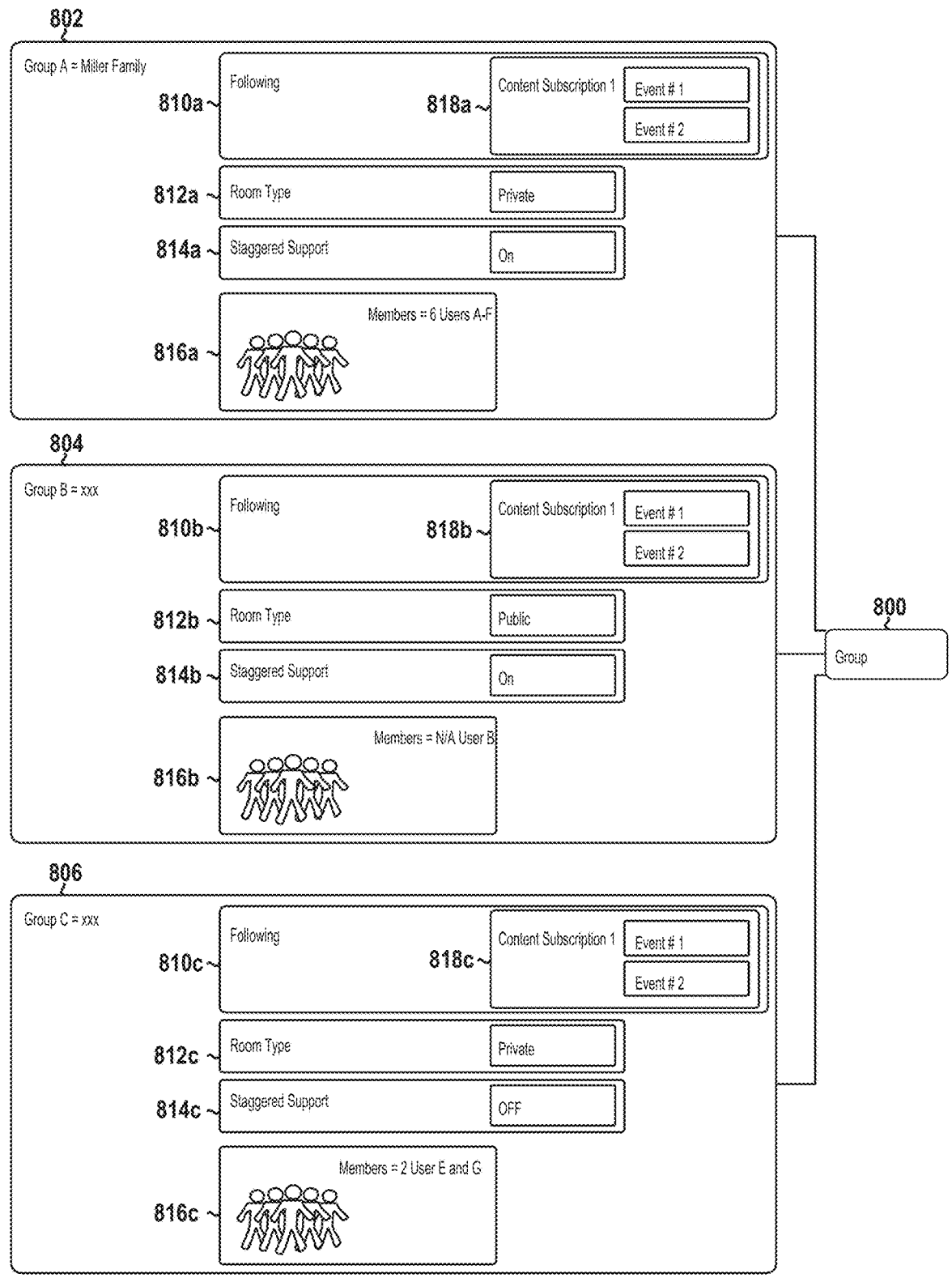
FIG. 8 illustrates components in a group information structure that could be used to establish, use and/or provide a context-centric shared-viewing viewing party in accordance with the embodiments.

FIG. 8 illustrates a group information structure 800 that may be used by devices configured in accordance with the embodiments to establish, use and/or provide a context-centric shared-viewing viewing party. In the example illustrated in FIG. 8, the information structure 800 includes a group A record 802, group B record 804, and group C record 806. Each of the records 802-806 may include a following IE 810, a room type IE 812, a staggered support IE 814, and a members IE 816. The following IE 810 includes a contents subscription IE 181, which includes event 1 and event 2 for all the illustrated records 802-806.

The group A record 802 indicates that the group A viewing group is the same as or encompasses the miller family group.

The following IE 810a-c for groups A-C all include content subscription 1.

Room type IE 812a and 812b are private for Groups A and C, whereas the room type IE 812b for group B is public.

Staggered support IEs 814a, 814b for groups A and B are on, whereas the staggered support IE 814c for Group C is off.

Members IE 816a indicates that there are 6 users (A-F) in group A. Members IE 816b indicates user B is the only member of Group B. Members IE 816c indicates that there are 2 users (E and G) in Group C.

Generally, a group may be a mechanism to organize several users into a single context stream. The group itself can have settings that help control membership and manage the experience outlined in the following diagrams.

A following may indicate what content is this context stream for outlined in subscription (Show) and populated event (episode).

A room type may indicate whether a group is public, private, a panel, etc. Public rooms are open to being joined by anyone, whereas private rooms require an invitation or request for acceptance (not depicted). A panel rooms may be followed by many with panel roles (publishing) by invitation only.

Staggered support indicates whether a room allows asynchronous viewing (On) or whether the room does not allow asynchronous viewing (Off), and the context stream is not stored for retrieval at a later date.

Members are users that participate/subscribe to this context stream. In a public room, these could be anonymous.

FIGS. 9-14 illustrate a method 900 for dynamic group management with fractured virtual multi-group layering and management in accordance with the for 7 users across 3 groups. FIGS. 9-14 outlines the experience each user has while viewing the same content. Method 900 may be performed by computing devices to implement the methods for establishing, using or providing the context-centric shared-viewing viewing party in accordance with the various embodiments.

Figure 9:
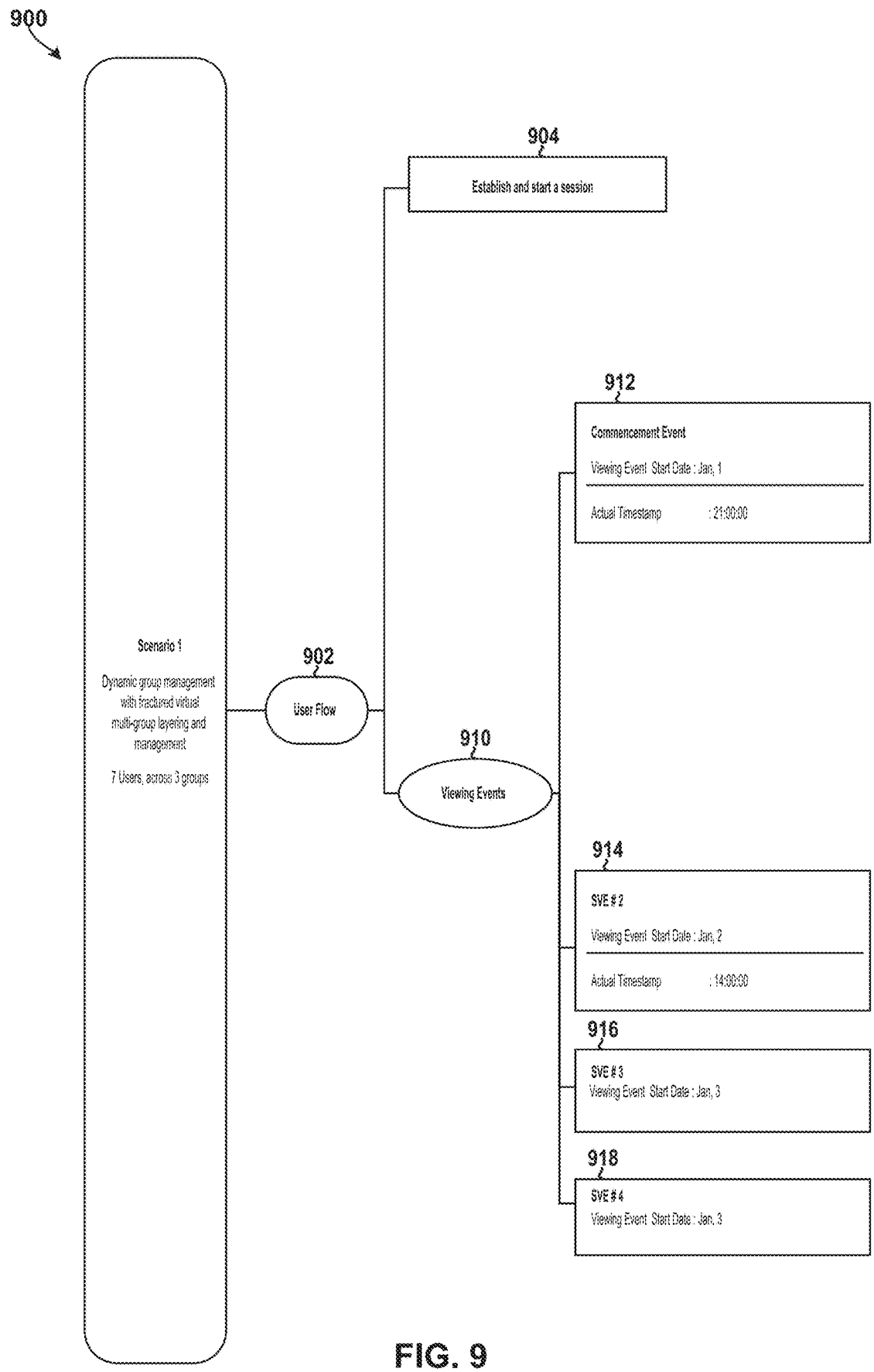
FIGS. 9-14 are component diagrams that illustrate methods for establishing, using and/or providing a context-centric shared-viewing viewing party in accordance with some embodiments.

FIG. 9. provides a high-level summary of the viewing events and when they take place. With reference to FIG. 9, method 900 includes a user flow 902 that includes establishing and starting a session in block 904 and various viewing events 910, such as the illustrated commencement event 912, and system viewing events (SVE) 914-918. Additional details regarding the establishing and starting of the session in block 904 are provided in FIG. 10. Similarly, additional details regarding the commencement event 912, SVE #1 914, SVE #2 916, and SVE #3 918 are provided in and described below with reference to FIGS. 11-14, respectively.

Figure 10:
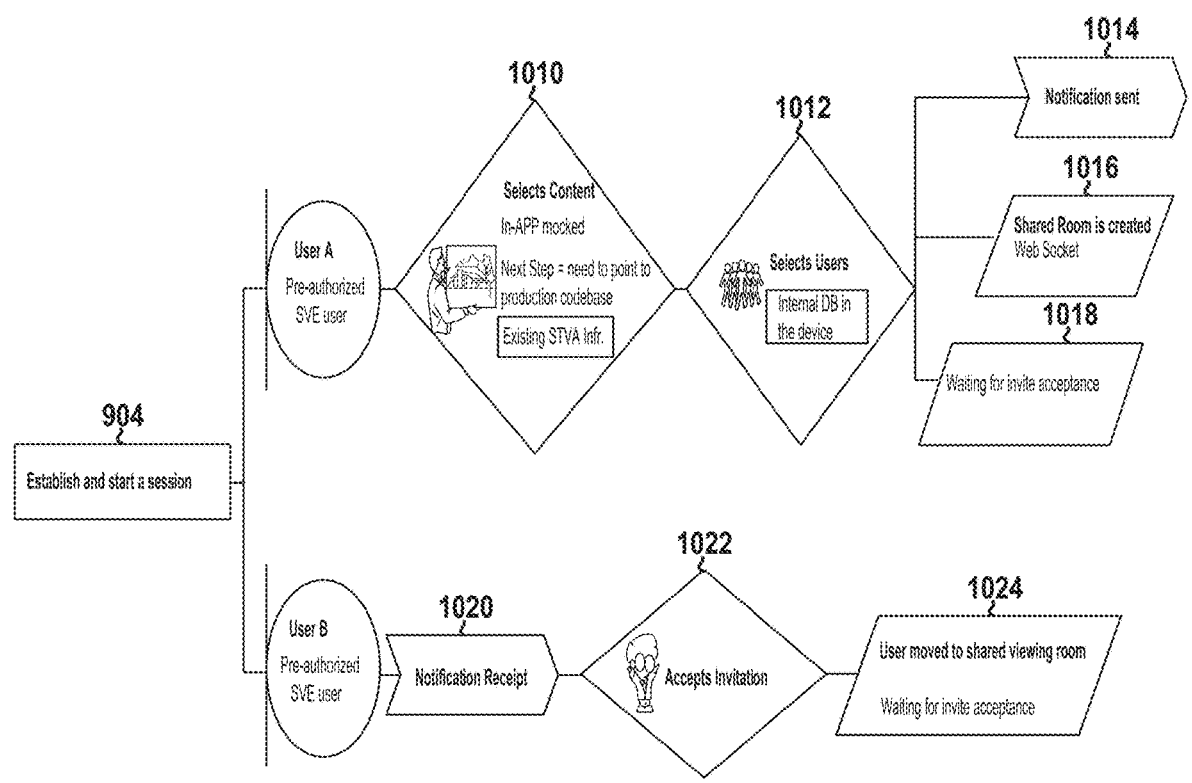

FIG. 10 illustrates a method for establishing and starting a session in accordance with some embodiments. In particular, FIG. 10 illustrates a generic single context stream invitation and acceptance between two users that are both part of group A. The intent of Group A is for them to watch the content together live.

The method illustrated in FIG. 10 includes user A selecting content in block 1010, selecting users in block 1012, sending a notification in block 1014, creating a shared room in block 1016, and waiting for an invite acceptance in block 1018. In block 1020, user B receives the notification sent in block 1014. User B accepts the invitation in block 1022, and is moved to the shared viewing room in block 1024. In this example, the commencement event 912 illustrated in FIG. 9 may be the commencement event "live airing of the show", and the only two users that are available to view are users A and B.

Figure 11:
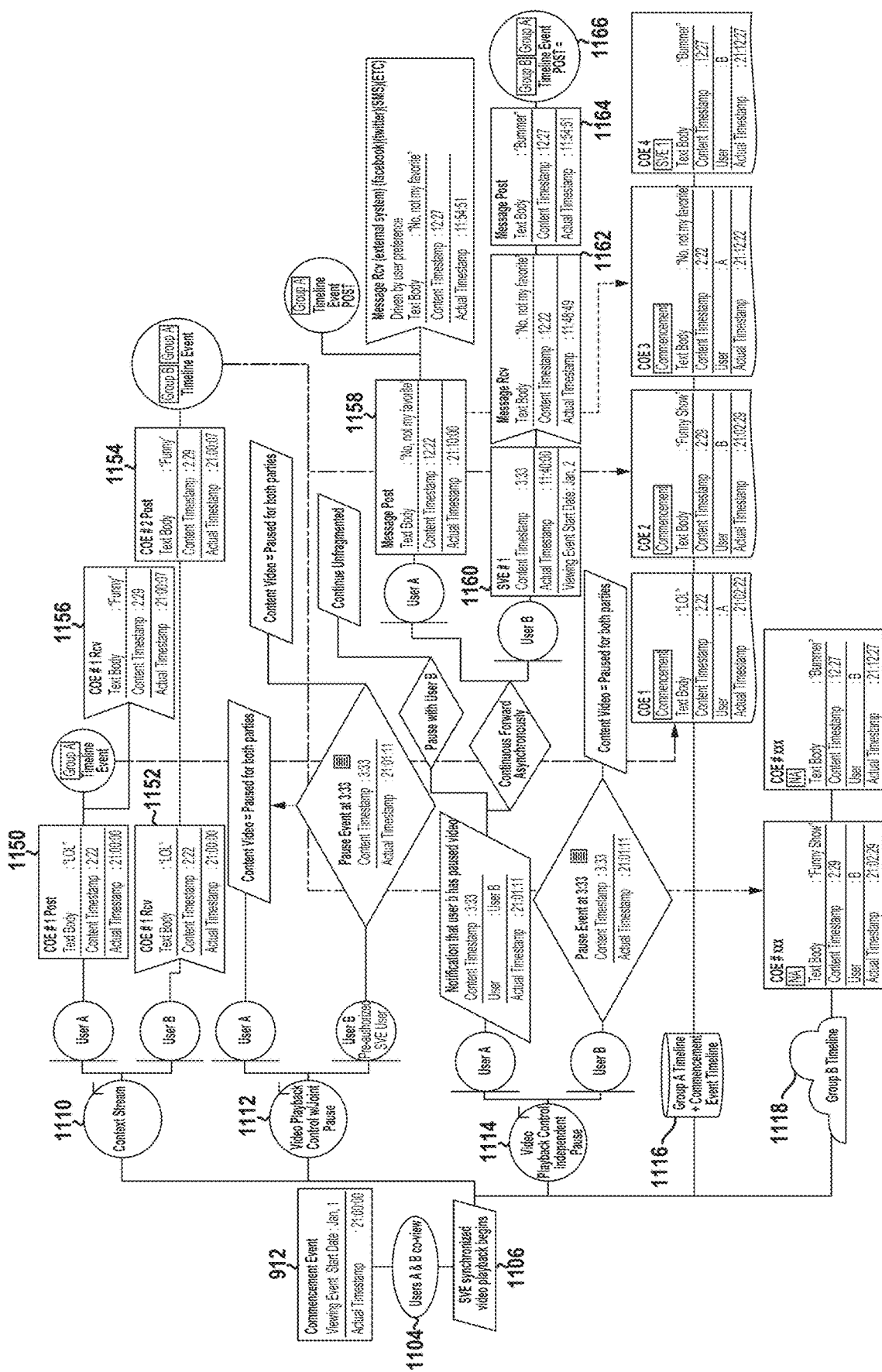

FIG. 11 illustrates a method of responding to a commencement event 912 in accordance with some embodiments. In particular, the FIG. 11 depicts the viewing experience for each user and highlights the mechanisms needed to manage the various experiences that arise while co-viewing. FIG. 11 also illustrates the engagement between user A and user B.

In block 1104, the system (e.g., context server 118, etc.) may determine that users A and B are configured to co-view the same content. In block 1106, the system may commence system viewing event (SVE) synchronized video playback. In block 1110, the system may detect and respond to a communication overlay event. In block 1112, the system may provide video playback control with joint pause. In block 1114, the system may provide video playback control with independent pause. In block 1116, the system may generate, use or store a Group A timeline and commencement event timeline. In block 1118, the system may generate, use or store a Group B timeline (e.g., based on information in the cloud, etc.).

As an example, in block 1150, user A may post a message 2:22 into the context stream. In block 1152, the post event may be received and sent to user B and stored against the group A timeline for this content. User B receives the message and responds in block 1154 with a POST, and since the user B publish setting is set to ALL, the post is associated with context stream A and B and routed to user A in block 1156.

As mentioned above, in block 1112, the system may provide video playback control with joint pause. That is, when a user is co-viewing live with a single context group, a single user can pause the video playback for the whole group (both users can pause). When User B unpauses, the content stream starts again.

An alternative to block 1112 is illustrated block 1114. User B pauses, and user A is notified but decides this is the only time that works for them and continues to view without user B. FIG. 11 further illustrates that in the continue forward asynchronously is User A viewing at one time with user B viewing at another.

FIG. 11 also illustrates a variety of timestamps. For example, in block 1158, user A posts a message at 21:10 on January 1. This message is stored for Group A. Block 1160 indicates that user B starts viewing this episode the next day on January 2 at 11:40. This is system viewing event (SVE) session #1. When user B reaches the content timestamp of the post that user A left the day before, they receive the post from user A in block 1162. User B's response is illustrated in block 1164 and is published/stored to group A and B context streams in block 1168. Based on User preferences not depicted in FIG. 11, user A could receive an SMS or some other form of out-of-system notification, allowing them to see the response and engage in the context stream (not depicted further).

Blocks 1116 and 1118 represent the stored events for each context stream after user A and B have viewed it.

Figure 12:
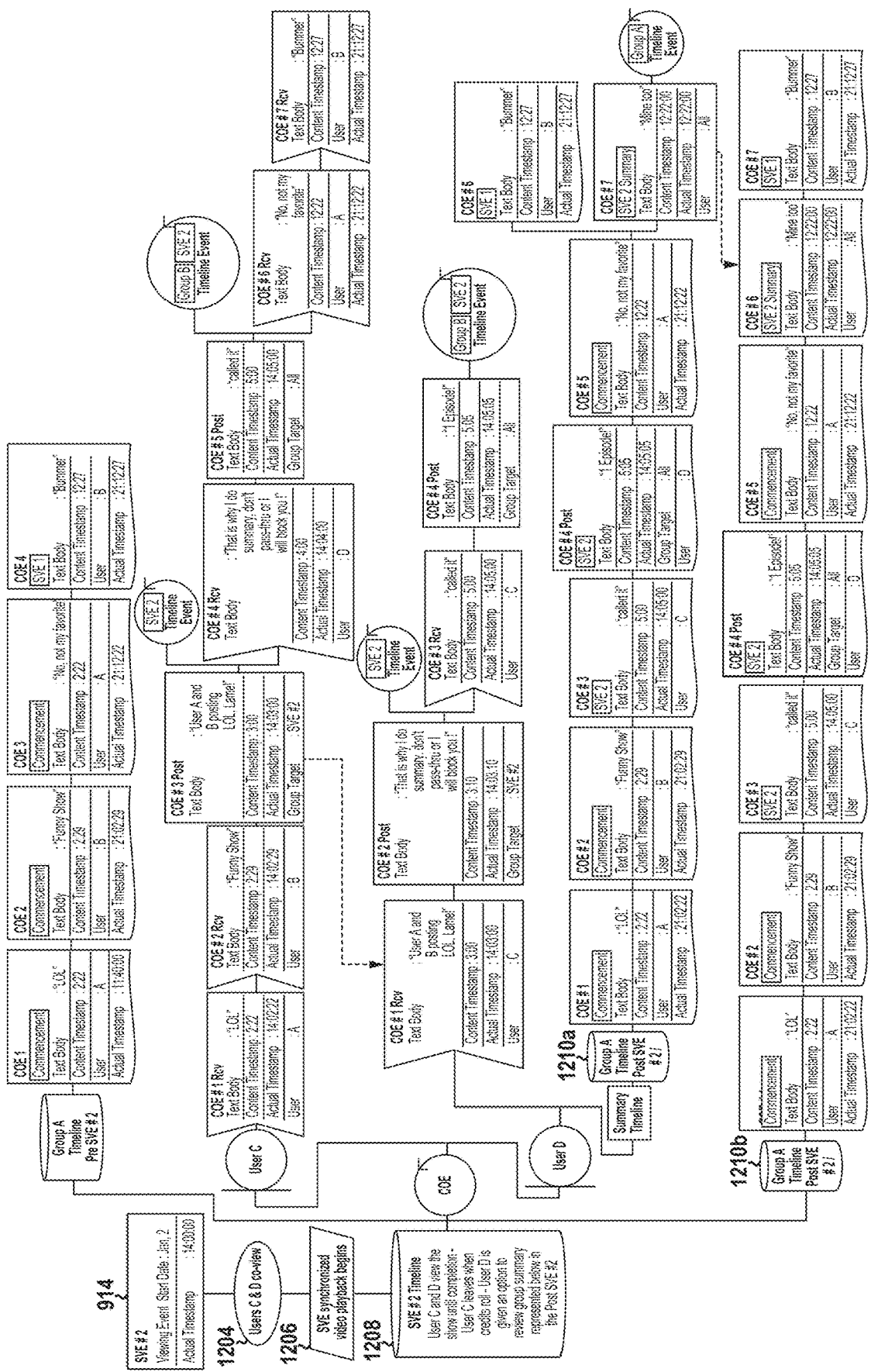
Figure 13:
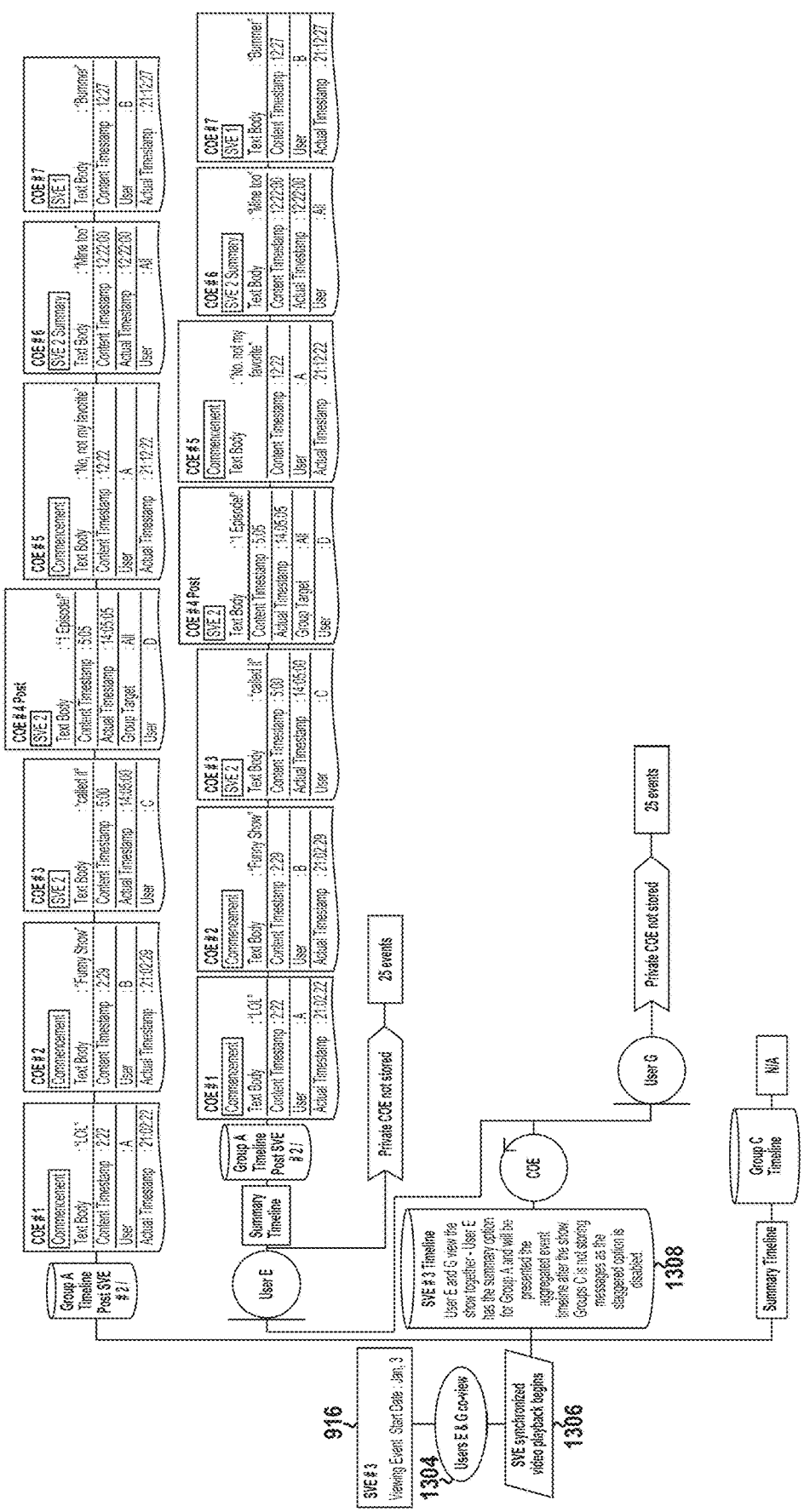
Figure 14:
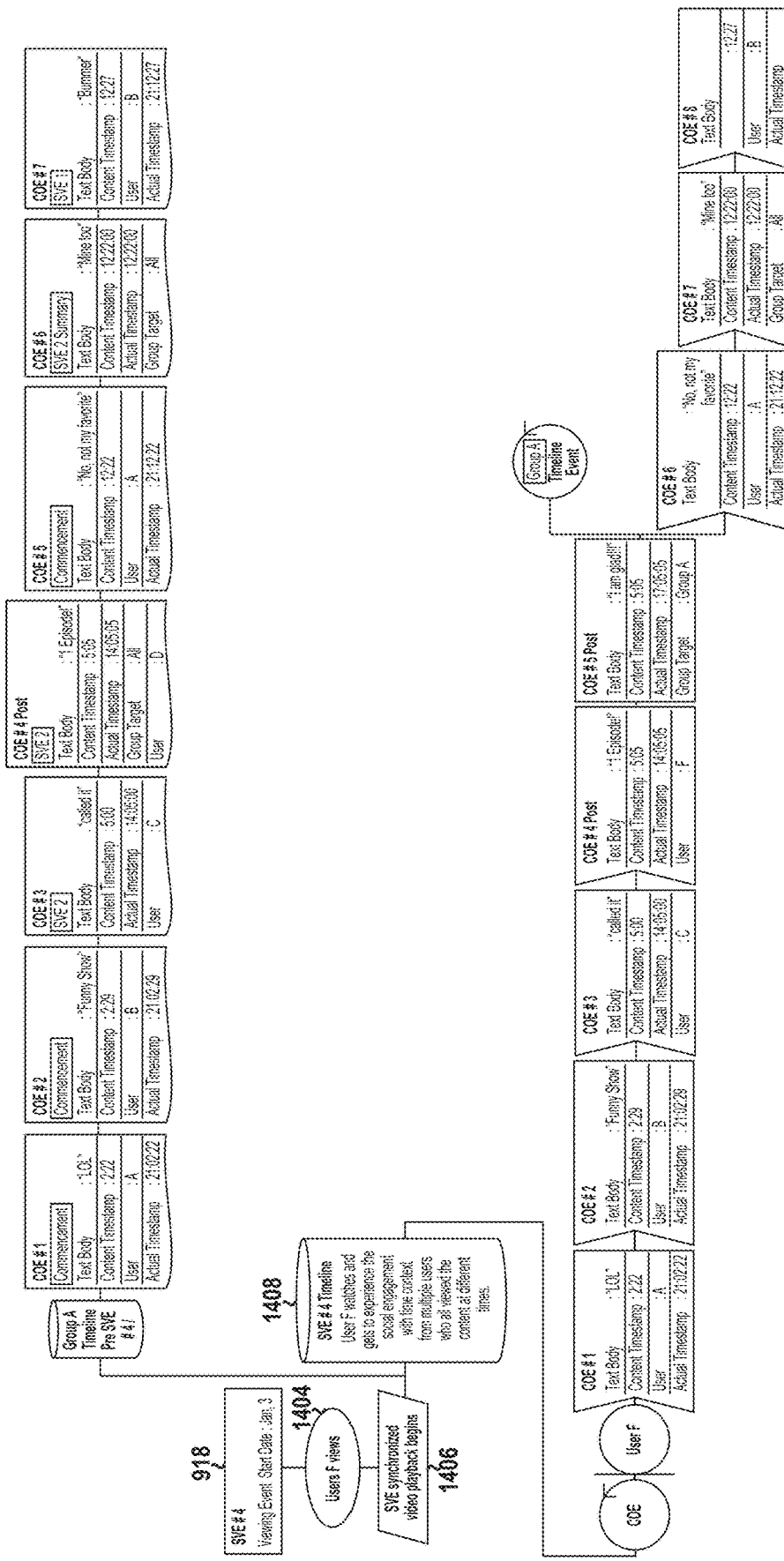

FIGS. 12-14 illustrate operations associated with example system viewing events (SVEs) 914, 916 and 918 in accordance with some embodiments. In particular, FIGS. 12-14 illustrate that users A-G may experience camaraderie and companionship through a shared viewing experience, and at the same time, view the content along with customized, unique, or different context. Each of users A-G may experience the content in a unique way in accordance with each of the context groups that they are each a member of and with the preference settings set by each user.

With reference to FIG. 12, in block 1204, the system (e.g., context server 118, etc.) may determine that users C and D are configured to co-view the same content. In block 1206, the system may commence SVE synchronized video playback. In block 1208, the system may perform various operations that allow or include users C and D viewing the show until completion, user C leaving when credits roll, and user D being given an option to review group summary (represented in FIG. 12 in the Post SVE #2.

In the example illustrated in FIG. 12, user C has opted to view with user D. User C's settings have asynchronous context streams being presented as they were posted to the timeline. In this case, the communication overlay events from user A and B are presented to user C when the content timestamp is reached. Alternatively, user D settings have summary selected for private groups and yes for event.

What is created is the option for the live viewing group between user C and user D to message directly without those messages being published to the timeline of context stream A.

Both users C & D start viewing the content-user C is presented with context from stream A when the timestamp is reached while user D is not. User C posts to the local timeline only as depicted in user C COE #3 Post, and user D receives and posts back to the local timeline. User C COE #5 POST is published to the Group A timeline, and to the live viewing event (user D). User D Receives and responds to the session and Group A. When the session is complete, user D is presented with a summary of the group A messages that were not presented within the context of the timeline and responds with COE #7 in response to an asynchronous event. That event is stored within the timeline context and depicted in block 1210b.

FIG. 13 illustrates the flexibility of user E viewing with the context from group A and the privacy of group C. User G never sees any of the engagements from group A, and user E has the option to engage with both context streams. In this case, user E does not engage with group A, but does engage with user G via group C. Group C does not support staggered, so messages are not stored and are not retrievable after the session is complete.

In particular, with reference to FIG. 13, in block 1304, the system (e.g., context server 118, etc.) may determine that users E and G are configured to co-view the same content. In block 1306, the system may commence SVE synchronized video playback. In block 1308, the system may perform various operations that allow or include users User E and G viewing the show together. User E may be provided with the summary option for Group A, and may be presented with an aggregated event timeline after the show has ended. Group C does not store messages as the staggered option is disable.

FIG. 14 highlights a solo asynchronous experience, and illustrates that a context may be a group or individual, both live or asynchronous. FIG. 14 also illustrates that the various embodiments support layering contexts on top of a single content.

With reference to FIG. 14, in block 1404, the system (e.g., context server 118, etc.) may determine that user F is the only user that is to view the content. In block 1406, the system may commence SVE synchronized video playback. In block 1408, the system may perform various operations that allow or include user F watching the content and experiencing the social engagement with time context from multiple users who all viewed the content at different times.

Thus, to recapitulate, FIG. 14 illustrates standalone asynchronous viewing. User F does not co-view live with anyone but does enjoy the full context of what group A has left behind. As the content timeline reaches the timestamp where the context is stored for context stream A, the event is presented to user F. User F responds with COE #5 POST, which is stored to the group A timeline and delivered to the remaining members on user settings.

Figure 15A:
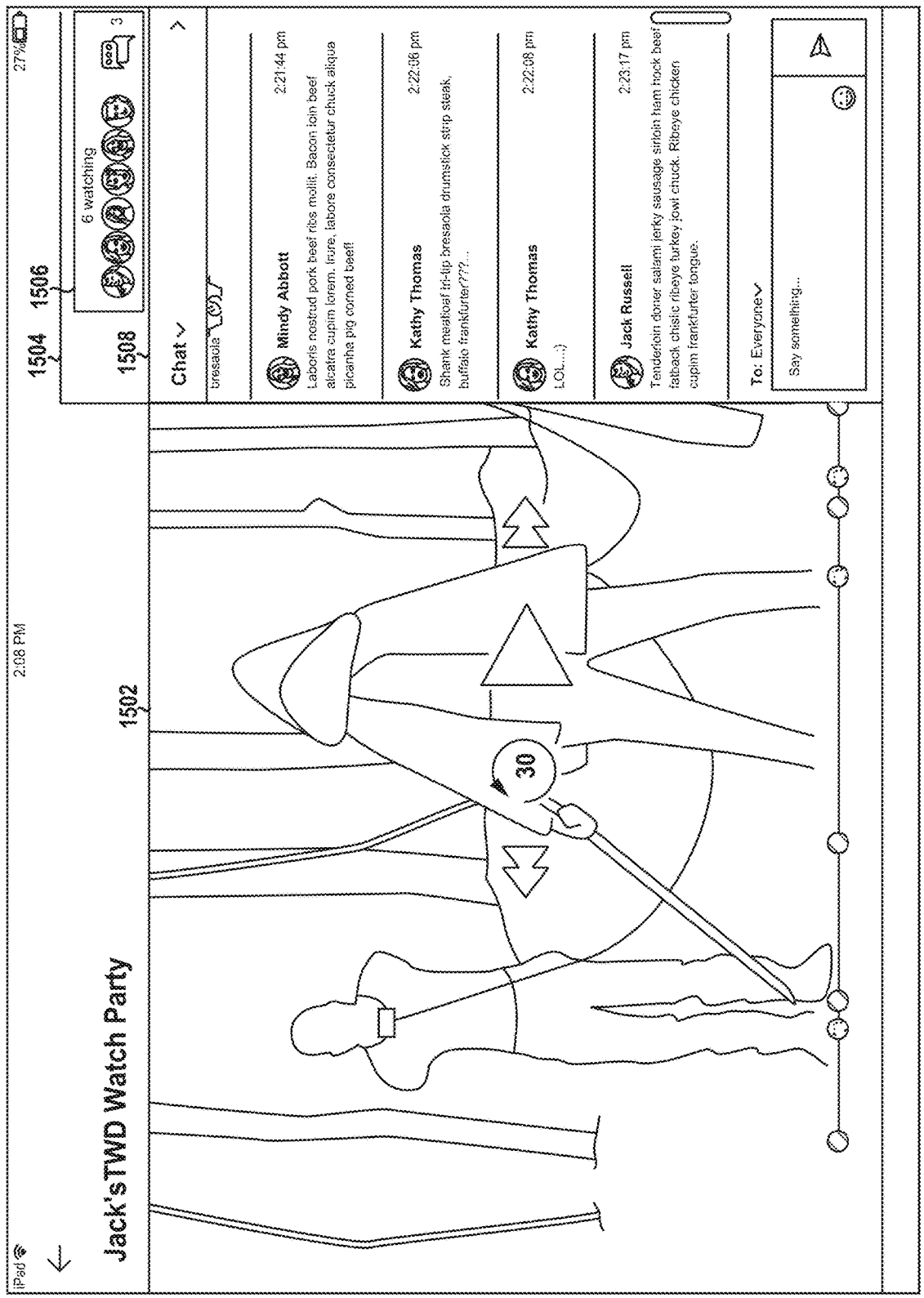
FIGS. 15A and 15B are illustration of user-interface screens of different users participating in a context-centric shared-viewing viewing party configured in accordance with some embodiments.
Figure 15B:
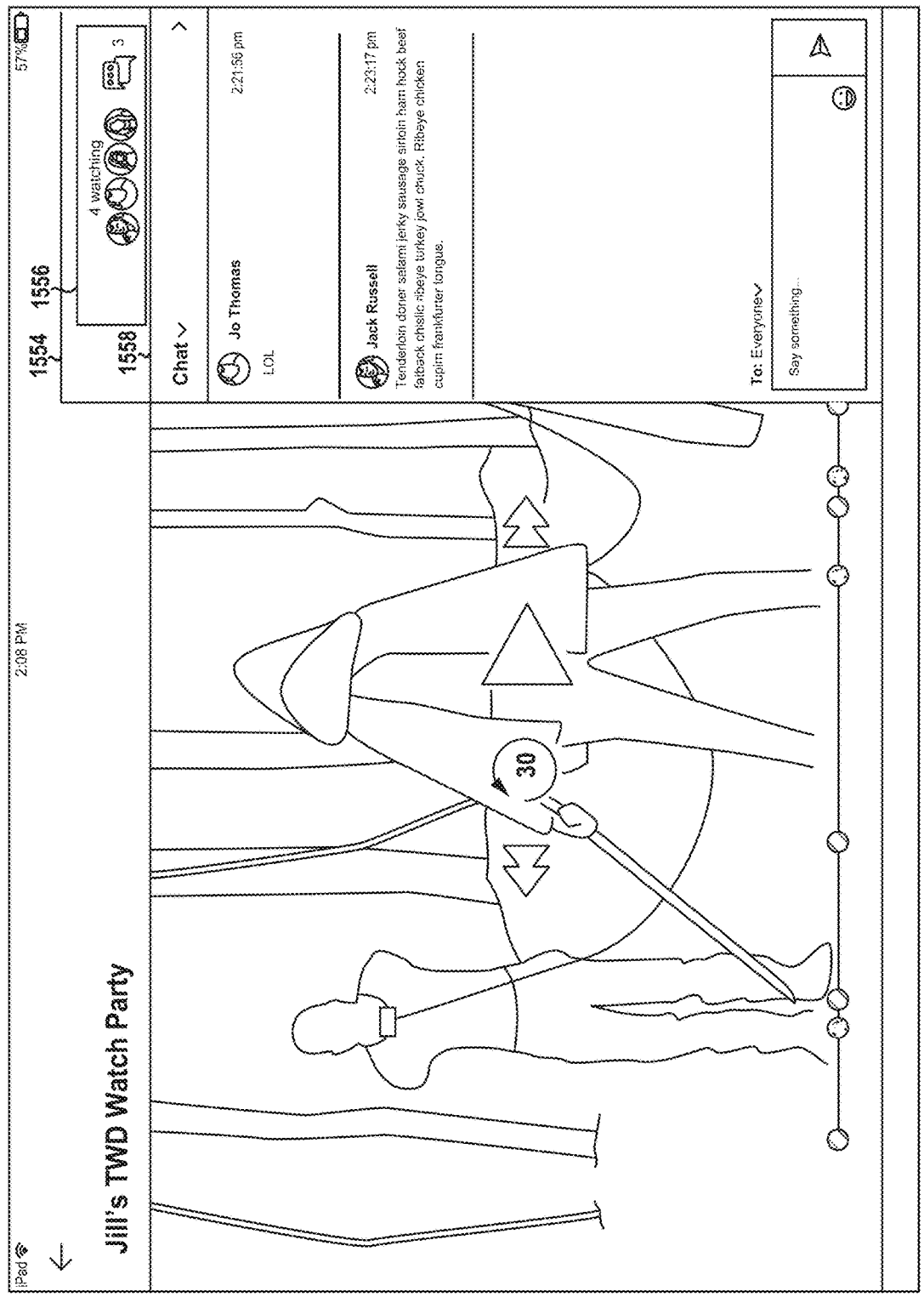

FIGS. 15A and 15B are illustrations of user-interface screens of different users participating in a context-centric shared-viewing viewing party. In particular, FIG. 15A illustrates the user-interface screen viewed by a first user (Jack) and FIG. 15B illustrates the user-interface screen viewed by another user (Jill).

With reference to FIG. 15A, Jack's user-interface screen includes a content portion 1502 and a context portion 1504. The context portion 1504 includes a summary portion 1506 that indicates that there are 6 people, including Jill, in Jack's watch party that currently watching the same content as Jack and contributing to the context. The context portion 1504 also includes a chat portion 1508 that shows chat/text context generated by the people in Jack's watch party.

With reference to FIG. 15B, Jill's user-interface screen includes the same content portion 1502 as Jack's (illustrated in FIG. 15A). However, Jill's user-interface screen includes a different context portion 1554 that displays different content. For example, the context portion 1554 includes a summary portion 1556 that indicates that there are 4 people in Jill's watch party, including Jack, that are currently watching the same content as Jill and contributing to the context. The context portion 1544 also includes a chat portion 1558 that shows chat/text context generated by the people in Jill's watch party.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

Figure 16:
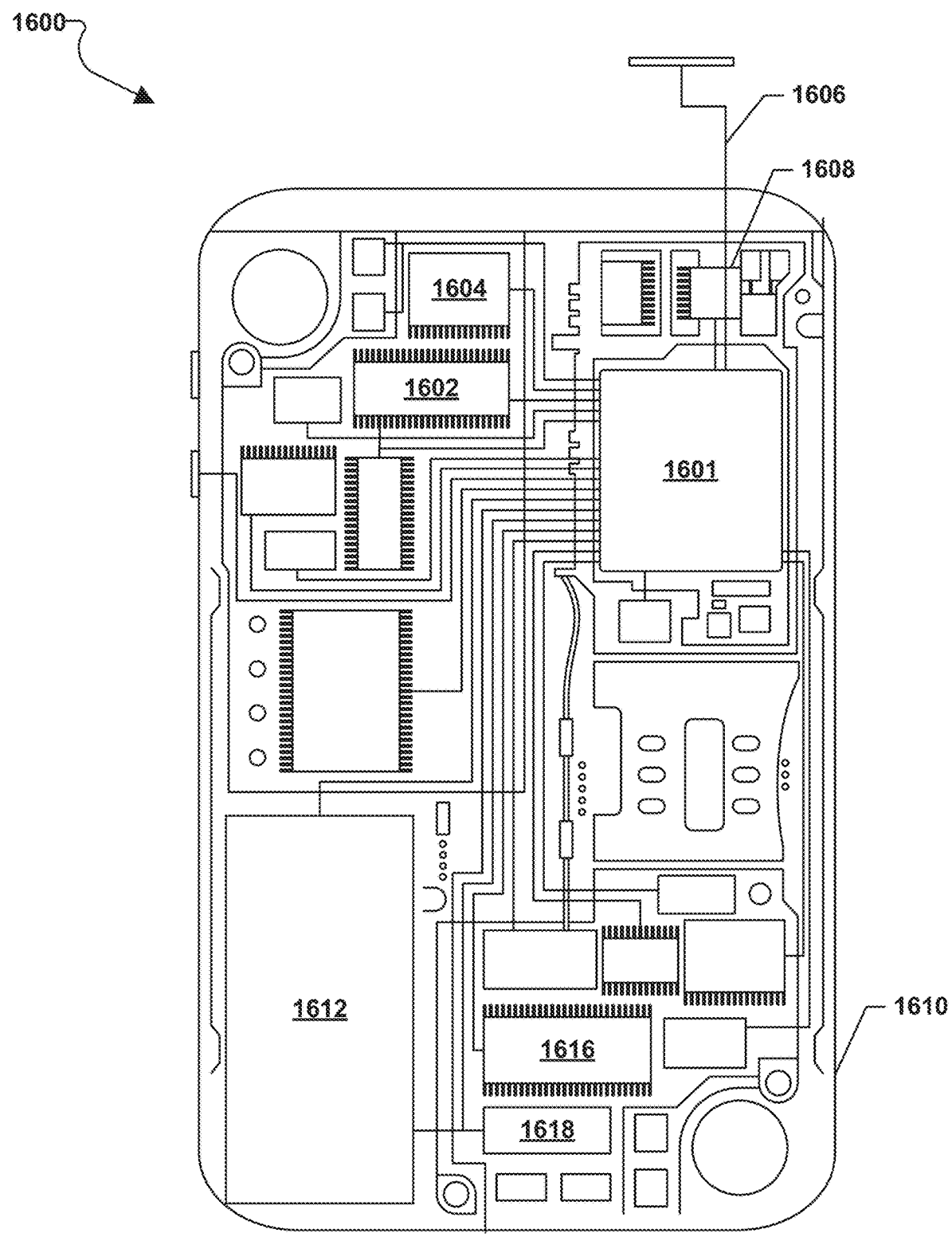
FIG. 16 is a block diagram of a user equipment (UE) device suitable for implementing some embodiments.

Some various embodiments (including, but not limited to, embodiments discussed above with reference to FIGS. 1-15B) may be implemented in any of a variety of UE computing devices, an example of which is illustrated in FIG. 16. For example, the computing device 1600 may include a processor 1601 coupled to a controller 1604 and an internal memory 1602. The processor 1601 may be one or more multicore integrated circuits (ICs) designated for general or specific processing tasks. The internal memory 1602 may be volatile or non-volatile memory, and may also be secure and/or encrypted memory, or unsecure and/or unencrypted memory, or any combination thereof.

The computing device 1600 may have one or more radio signal transceivers 608 (e.g., Peanut®, Bluetooth®, Zig-Bee®, Wi-Fi, cellular, etc.) and antennae 1606, for sending and receiving, coupled to each other and/or to the processor 1601. The transceivers 1608 and antennae 1606 may be used with the above-mentioned circuitry to implement the various wireless transmission protocol stacks and interfaces. The computing device 1600 may include a cellular network wireless modem chip 1616 that enables communication via a cellular network and is coupled to the processor.

The computing device 1600 may include a peripheral device connection interface 1618 coupled to the processor 1601. The peripheral device connection interface 1618 may be singularly configured to accept one type of connection, or multiply configured to accept various types of physical and communication connections, common or proprietary, such as USB, FireWire, Thunderbolt, or PCIe. The peripheral device connection interface 1618 may also be coupled to a similarly configured peripheral device connection port (not shown).

The computing device 1600 may also include a housing 1610, constructed of a plastic, metal, or a combination of materials, for containing all or some of the components discussed herein. The computing device 1600 may include a power source 1612 coupled to the processor 1601, such as a disposable or rechargeable battery. The rechargeable battery may also be coupled to the peripheral device connection port to receive a charging current from a source external to the computing device 1600.

Figure 17:
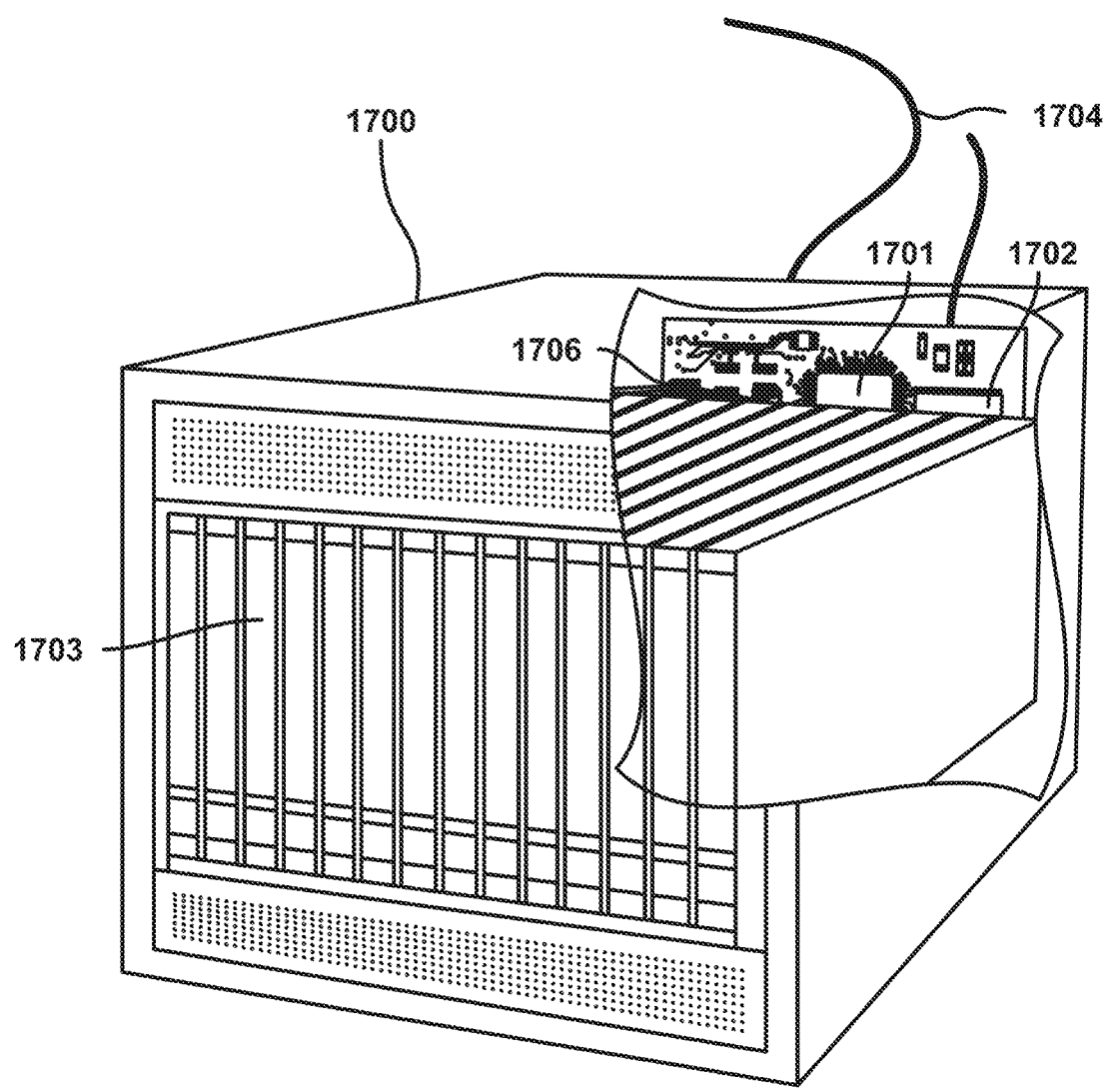
FIG. 17 is a component diagram of an example server suitable for implementing some embodiments.

Some embodiments may be implemented on any of a variety of commercially available computing devices, such as the server computing device 1700 illustrated in FIG. 17. Such a server device 1700 may include a processor 1701 coupled to volatile memory 1702 and a large capacity nonvolatile memory, such as a disk drive 1703. The server device 1700 may also include a floppy disc drive, USB, compact disc (CD) or DVD disc drive coupled to the processor 1701. The server device 1700 may also include network access ports 1706 coupled to the processor 1701 for establishing data connections with a network connection circuit 1704 and a communication network (e.g., IP network) coupled to other communication system network elements.

Figure 18:
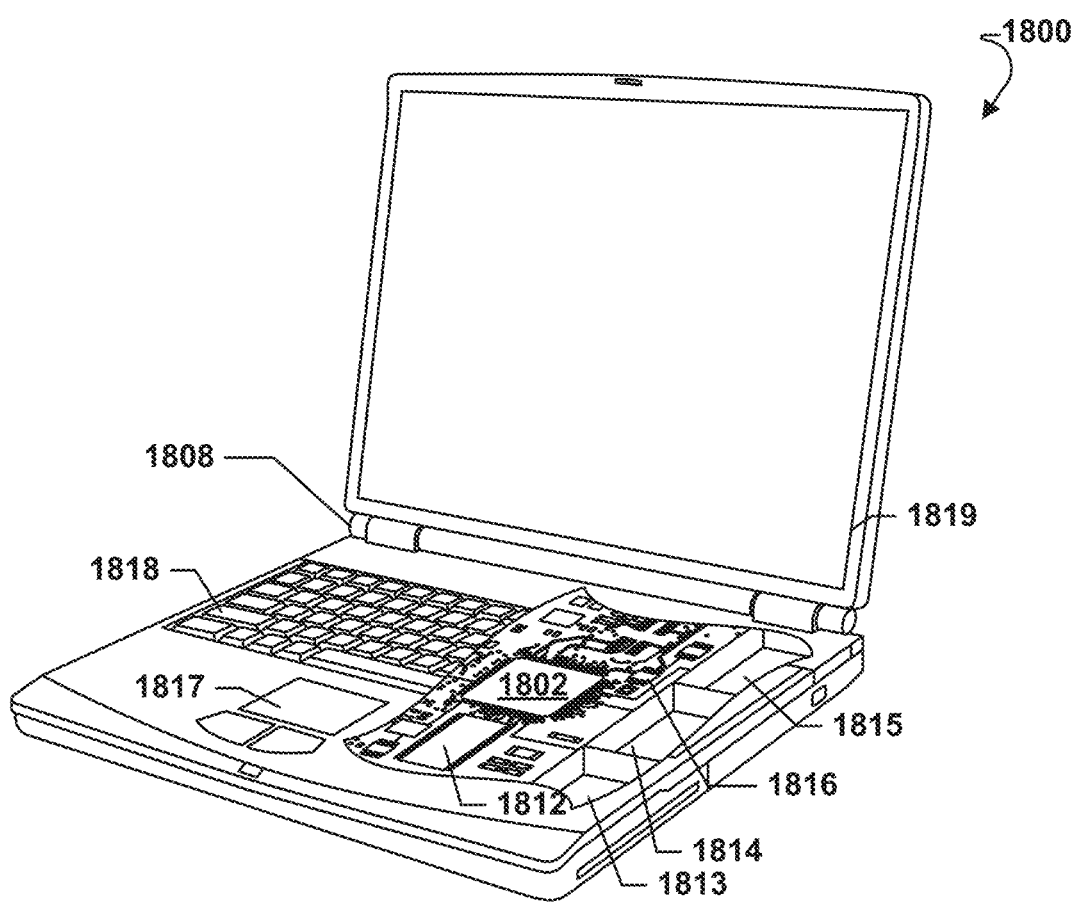
FIG. 18 is a component block diagram illustrating an example mobile computing device suitable for use with various embodiments.

Various embodiments (including, but not limited to, embodiments described above with reference to FIGS. 1-15) may be implemented in a wide variety of computing systems include a laptop computer 1800 an example of which is illustrated in FIG. 18. Many laptop computers include a touchpad touch surface 1817 that serves as the computer's pointing device, and thus may receive drag, scroll, and flick gestures similar to those implemented on computing devices equipped with a touch screen display and described above. A laptop computer 1800 will typically include a processor 1802 coupled to volatile memory 1812 and a large capacity nonvolatile memory, such as a disk drive 1813 of Flash memory. Additionally, the computer 1800 may have one or more antenna 1808 for sending and receiving electromagnetic radiation that may be connected to a wireless data link and/or cellular telephone transceiver 1816 coupled to the processor 1802. The computer 1800 may also include a floppy disc drive 1814 and a compact disc (CD) drive 1815 coupled to the processor 1802. In a notebook configuration, the computer housing includes the touchpad 1817, the keyboard 1818, and the display 1819 all coupled to the processor 1802. Other configurations of the computing device may include a computer mouse or trackball coupled to the processor (e.g., via a USB input) as are well known, which may also be used in conjunction with Various embodiments.

The processors discussed in this application may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors themselves. Additionally, as used herein, any reference to a memory may be a reference to a memory storage and the terms may be used interchangeable.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of establishing a context-centric shared-viewing party, comprising:
    determining, by a network server processor, content for shared viewing based on inputs received from a user via a user device;
    selecting, by the network server processor, a first context participant group, wherein each of the user and participants in the selected first context participant group shares a first commonality with the other participants in the first context participant group;
    selecting, by the network server processor, a second context participant group, wherein each of the user and participants in the second context participant group share a second commonality that is different from the first commonality with the other participants in the second context participant group;
    generating, by the network server processor, an individualized context stream for the user based on received context; and
    sending, by the network server processor, the generated individualized context stream to the user device.

2. The method of claim 1, wherein each of the participants in the first and second context participant groups is associated with one or more participant devices.

3. The method of claim 1, wherein selecting the first context participant group comprises selecting at least one or more of:
    a publicly accessible context participant group;
    a private context participant group in which membership to the private group is designated by the user; or
    a third party platform context participant group in which membership is designated by a third party entity.

4. The method of claim 1, further comprising:
    receiving, by the user device, a content stream;
    receiving, by the user device, a context stream;
    synchronizing, by the user device, the received context stream with the received content steam;
    overlaying, by the user device, the context and content streams to generate a customized contextualized content overlay stream; and
    rendering, by the user device, the customized contextualized content overlay stream on an electronic display of the user device.

5. The method of claim 4, further comprising storing, by the user device, the customized contextualized content overlay stream for subsequent presentation to the user.

6. A network server computing device, comprising:
    a processor configured to:
        determine content for shared viewing based on inputs received from a user via a user device;
        select a first context participant group, wherein each of the user and participants in the selected first context participant group shares a first commonality with the other participants in the first context participant group;
        select a second context participant group, wherein each of the user and participants in the second context participant group share a second commonality that is different from the first commonality with the other participants in the second context participant group;
        generate an individualized context stream for the user based on received context; and
        send the generated individualized context stream to the user device.

7. The network server computing device of claim 6, wherein each of the participants in the first and second context participant groups is associated with one or more participant devices.

8. The network server computing device of claim 6, wherein the processor is configured to select the first context participant group by selecting at least one or more of:
    a publicly accessible context participant group;
    a private context participant group in which membership to the private group is designated by the user; or
    a third party platform context participant group in which membership is designated by a third party entity.

9. The network server computing device of claim 6, wherein the processor is configured to send a context stream to the user device causes the user device to:
    receive a content stream;
    receive the context stream;
    synchronize the received context stream with the received content steam;
    overlay the context and content streams to generate a customized contextualized content overlay stream; and
    render the customized contextualized content overlay stream on an electronic display of the user device.

10. The network server computing device of claim 9, wherein the processor is further configured so that sending the context stream to the user device causes the user device to store the customized contextualized content overlay stream for subsequent presentation to the user.

11. A non-transitory computer readable storage medium having stored thereon processor-executable software instructions configured to cause a network server processor to perform operations for establishing a context-centric shared-viewing party, the operations comprising:
    determining content for shared viewing based on inputs received from a user via a user device;
    selecting a first context participant group, wherein each of the user and participants in the selected first context participant group shares a first commonality with the other participants in the first context participant group;

selecting a second context participant group, wherein each of the user and participants in the second context participant group share a second commonality that is different from the first commonality with the other participants in the second context participant group;

generating an individualized context stream for the user based on received context; and sending the generated individualized context stream to the user device.

12. The non-transitory computer readable storage medium of claim 11, wherein each of the participants in the first and second context participant groups is associated with one or more participant devices.

13. The non-transitory computer readable storage medium of claim 11, wherein the stored processor-executable software instructions are configured to cause a processor to perform operations such that selecting the first context participant group comprises selecting at least one or more of:
   a publicly accessible context participant group;
   a private context participant group in which membership to the private group is designated by the user; or
   a third party platform context participant group in which membership is designated by a third party entity.

14. The non-transitory computer readable storage medium of claim 11, wherein the stored processor-executable software instructions are configured to cause the network server processor to perform operations that further include sending a context stream to the user device causes the user device to:
   receive a content stream;
   receive the context stream;
   synchronize the received context stream with the received content steam;
   overlay the context and content streams to generate a customized contextualized content overlay stream; and
   render the customized contextualized content overlay stream on an electronic display of the user device.

15. The non-transitory computer readable storage medium of claim 14, wherein the stored processor-executable software instructions are configured to cause the network server processor to perform operations such that sending the context stream to the user device causes the user device to store the customized contextualized content overlay stream for subsequent presentation to the user.

16. A method of establishing a context-centric shared-viewing party, comprising:
   determining, by a network server processor, content for shared viewing based on inputs received from a user via a user device;
   selecting a first context participant group, wherein each of the user and participants in the selected group share a commonality with the other participants in that group;
   requesting and receiving the determined content from a content server;
   relaying the received content to the participants in the selected groups via respective participant content streams;
   receiving complementary context in response to relaying the received content via the respective participant content streams;
   synchronizing the received complementary context with the received content to generate a customized contextualized content overlay stream that is specific to the user; and
   sending the customized contextualized content overlay stream to the user device.

17. The method of claim 16, further comprising:
   synchronizing complementary context specific to a participant with the received content to generate participant customized contextualized content overlay stream that is specific to that participant; and
   sending the customized contextualized content overlay stream specific to that participant via the respective participant content streams.

18. The method of claim 17, further comprising storing the customized contextualized content overlay stream specific to that participant for asynchronous consumption in response to determining that the participant is currently offline or not receiving the respective participant content streams.

19. The method of claim 16, further comprising storing the customized contextualized content overlay stream for subsequent presentation to the user in response to determining that the participant is currently offline or not receiving the respective participant content streams.

20. The method of claim 16, further comprising storing the customized contextualized content overlay stream for asynchronous consumption in response to determining that the user is currently offline.

21. The method of claim 20, further comprising commencing the sending of the stored customized contextualized content overlay stream in response to determining that the user device has come online or requested to receive a content stream.

22. The method of claim 21, further comprising:
   receiving asynchronous complementary context from the user device in response to commencing the sending of the stored customized contextualized content overlay stream to the user device; and
   generating and storing updated customized contextualized content overlay stream based on the customized contextualized content overlay stream and the received asynchronous complementary context.

23. The method of claim 22, further comprising sending an alert message to participants in the selected groups to inform them of the availability of updated customized contextualized content overlay stream.

24. The method of claim 16, wherein synchronizing the received complementary context with the received content to generate the customized contextualized content overlay stream that is specific to the user comprises synchronizing the received complementary context with a real time live event to generate the customized contextualized content overlay stream that is specific to the user.

25. The method of claim 16, wherein selecting the context participant group comprises selecting at least two context participant groups, each context participant group including one or more participants, each participant being associated with one or more participant devices.

26. The method of claim 16, wherein selecting the context participant group comprises selecting at least one or more of:
   a publicly accessible context participant group;
   a private context participant group in which membership to the private group is designated by the user; or
   a third party platform context participant group in which membership is designated by a third party entity.

27. A network server computing device, comprising:
   a processor configured to:
      determine content for shared viewing based on inputs received from a user via a user device;

select a context participant group, wherein each of the user and participants in the selected context participant group share a commonality with the other participants in that group;

request and receive the determined content from a content server;

relay the received content to the participants in the selected groups via respective participant content streams;

receive complementary context in response to relaying the received content via the respective participant content streams;

synchronize the received complementary context with the received content to generate a customized contextualized content overlay stream that is specific to the user; and send the customized contextualized content overlay stream to the user device.

28. The network server computing device of claim 27, wherein the processor is further configured to:

synchronize complementary context specific to a participant with the received content to generate participant customized contextualized content overlay stream that is specific to that participant; and send the customized contextualized content overlay stream specific to that participant via the respective participant content streams.

29. The network server computing device of claim 28, wherein the processor is further configured to store the customized contextualized content overlay stream specific to that participant for asynchronous consumption in response to determining that the participant is currently offline or not receiving the respective participant content streams.

30. The network server computing device of claim 27, wherein the processor is further configured to store the customized contextualized content overlay stream for subsequent presentation to the user.

31. The network server computing device of claim 27, wherein the processor is further configured to store the customized contextualized content overlay stream for asynchronous consumption in response to determining that the user is currently offline or not receiving a content stream.

32. The network server computing device of claim 31, wherein the processor is further configured to commence sending the stored customized contextualized content overlay stream to the user device in response to determining that the user device has come online or requested to receive the content stream.

33. The network server computing device of claim 32, wherein the processor is further configured to:

receive asynchronous complementary context from the user device in response to commencing the sending of the stored customized contextualized content overlay stream to the user device; and generate and store updated customized contextualized content overlay stream based on the customized contextualized content overlay stream and the received asynchronous complementary context.

34. The network server computing device of claim 33, wherein the processor is further configured to send an alert message to participants in the selected groups to inform the participants in the groups of the availability of updated customized contextualized content overlay stream.

35. The network server computing device of claim 27, wherein the processor is further configured to synchronize the received complementary context with the received content to generate the customized contextualized content overlay stream that is specific to the user by synchronizing the received complementary context with a real time live event to generate the customized contextualized content overlay stream that is specific to the user.

36. The network server computing device of claim 27, wherein the processor is further configured to select the context participant group by selecting at least two context participant groups, each context participant group including one or more participants, each participant being associated with one or more participant devices.

37. The network server computing device of claim 27, wherein the processor is further configured to select the context participant group by selecting at least one or more of:

a publicly accessible context participant group;

a private context participant group in which membership to the private group is designated by the user; or a third party platform context participant group in which membership group is designated by a third party entity.

38. A non-transitory computer readable storage medium having stored thereon processor-executable software instructions configured to cause a processor to perform operations for establishing a context-centric shared-viewing party, the operations comprising:

determining content for shared viewing based on inputs received from a user via a user device;

selecting a context participant group, wherein each of the user and participants in the selected group share a commonality with the other participants in that group;

requesting and receiving the determined content from a content server;

relaying the received content to the participants in the selected groups via respective participant content streams;

receiving complementary context in response to relaying the received content via the respective participant content streams;

synchronizing the received complementary context with the received content to generate a customized contextualized content overlay stream that is specific to the user; and sending the customized contextualized content overlay stream to the user device.

39. The non-transitory computer readable storage medium of claim 38, wherein the stored processor-executable software instructions are configured to cause a processor to perform operations further comprising:

synchronizing complementary context specific to a participant with the received content to generate participant customized contextualized content overlay stream that is specific to that participant; and sending the customized contextualized content overlay stream specific to that participant via the respective participant content streams.

40. The non-transitory computer readable storage medium of claim 39, wherein the stored processor-executable software instructions are configured to cause a processor to perform operations further comprising storing the customized contextualized content overlay stream specific to that participant for asynchronous consumption in response to determining that the participant is currently offline or not receiving the respective participant content streams.

41. The non-transitory computer readable storage medium of claim 38, wherein the stored processor-executable software instructions are configured to cause a processor to perform operations further comprising storing the customized contextualized content overlay stream for subsequent presentation to the user.

42. The non-transitory computer readable storage medium of claim 38, wherein the stored processor-executable software instructions are configured to cause a processor to perform operations further comprising storing the customized contextualized content overlay stream for asynchronous consumption in response to determining that the user is currently offline or not receiving a content stream.

43. The non-transitory computer readable storage medium of claim 42, wherein the stored processor-executable software instructions are configured to cause a processor to perform operations further comprising commencing sending the stored customized contextualized content overlay stream to the user device in response to determining that the user device has come online or requested to receive the content stream.

44. The non-transitory computer readable storage medium of claim 43, wherein the stored processor-executable software instructions are configured to cause a processor to perform operations further comprising:
   receiving asynchronous complementary context from the user device in response to commencing the sending of the stored customized contextualized content overlay stream to the user device; and
   generating and storing updated customized contextualized content overlay stream based on the customized contextualized content overlay stream and the received asynchronous complementary context.

45. The non-transitory computer readable storage medium of claim 44, wherein the stored processor-executable software instructions are configured to cause a processor to perform operations further comprising sending an alert message to participants in the selected groups to inform them of the availability of updated customized contextualized content overlay stream.

46. The non-transitory computer readable storage medium of claim 38, wherein the stored processor-executable software instructions are configured to cause a processor to perform operations such that synchronizing the received complementary context with the received content to generate the customized contextualized content overlay stream that is specific to the user comprises synchronizing the received complementary context with a real time live event to generate the customized contextualized content overlay stream that is specific to the user.

47. The non-transitory computer readable storage medium of claim 38, wherein the stored processor-executable software instructions are configured to cause a processor to perform operations such that selecting the context participant group comprises selecting at least two context participant groups, each context participant group including one or more participants, each participant being associated with one or more participant devices.

48. The non-transitory computer readable storage medium of claim 38, wherein the stored processor-executable software instructions are configured to cause a processor to perform operations such that selecting the context participant group comprises selecting at least one or more of:
   a publicly accessible context participant group;
   a private context participant group in which membership to the private group is designated by the user; or
   a third party platform context participant group in which membership is designated by a third party entity.

\* \* \* \* \*